US008504578B2

(12) United States Patent
Scholtes et al.

(10) Patent No.: US 8,504,578 B2
(45) Date of Patent: **\*Aug. 6, 2013**

(54) SYSTEM AND METHOD FOR NEAR AND EXACT DE-DUPLICATION OF DOCUMENTS

(75) Inventors: Johannes C. Scholtes, Amsterdam (NL); Siebe Bloembergen, Amsterdam (NL)

(73) Assignee: MSC Intellectual Properties B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/587,597

(22) Filed: Aug. 16, 2012

(65) Prior Publication Data

US 2012/0317126 A1    Dec. 13, 2012

Related U.S. Application Data

(63) Continuation of application No. 13/075,792, filed on Mar. 30, 2011, now Pat. No. 8,250,079, which is a continuation of application No. 12/113,140, filed on Apr. 30, 2008, now Pat. No. 7,930,306.

(51) Int. Cl.
*G06F 17/30* (2006.01)

(52) U.S. Cl.
USPC .......... 707/750; 707/736; 707/741; 707/749; 707/751; 707/752; 707/754

(58) Field of Classification Search
USPC ................. 707/736, 741, 749, 750, 751, 752, 707/754
See application file for complete search history.

(56) References Cited

U.S. PATENT DOCUMENTS

| | | | | |
|---|---|---|---|---|
| 6,130,723 | A * | 10/2000 | Medin | 348/607 |
| 6,249,784 | B1 * | 6/2001 | Macke et al. | 1/1 |
| 6,253,169 | B1 * | 6/2001 | Apte et al. | 704/9 |
| 6,278,992 | B1 * | 8/2001 | Curtis et al. | 707/711 |
| 2003/0014415 | A1 * | 1/2003 | Weiss et al. | 707/10 |
| 2003/0050908 | A1 * | 3/2003 | Kreulen et al. | 707/1 |
| 2007/0074123 | A1 * | 3/2007 | Omura et al. | 715/753 |
| 2008/0071763 | A1 * | 3/2008 | Ferrenq et al. | 707/5 |
| 2008/0201632 | A1 * | 8/2008 | Hong et al. | 715/230 |

OTHER PUBLICATIONS

Jonathan Koberstein and Yiu-Kai Ng "Using Word Clusters to Detect Similar Web Documents" Springer-Verlag Berlin Heidelberg, pp. 215-228, (2006).*
Copyright deposit No. TX 6-320-844 "1-ZYIMAGE. 5.0." ZyLAB Technologies BV, Amsterdam, NL, 1983-2005. 20 pages.
Copyright deposit No. Txu 534-683 "Zy4 search module main module", Information Dimensions, Incorporated, Oct. 3, 1991.

* cited by examiner

*Primary Examiner* — Hosain Alam
*Assistant Examiner* — Ahmed Abraham
(74) *Attorney, Agent, or Firm* — Carlos R. Villamar; The Villamar Firm PLLC

(57) ABSTRACT

A system, method and computer program product for identifying near and exact-duplicate documents in a document collection, including for each document in the collection, reading textual content from the document; filtering the textual content based on user settings; determining N most frequent words from the filtered textual content of the document; performing a quorum search of the N most frequent words in the document with a threshold M; and sorting results from the quorum search based on relevancy. Based on the values of N and M near and exact-duplicate documents are identified in the document collection.

18 Claims, 21 Drawing Sheets

SYSTEM AND METHOD FOR NEAR AND EXACT DE-DUPLICATION OF DOCUMENTS

CROSS REFERENCE TO RELATED APPLICATIONS

The present invention is a continuation of U.S. patent application Ser. No. 13/075,792 of SCHOLTES et al., entitled "SYSTEM AND METHOD FOR NEAR AND EXACT DE-DUPLICATION OF DOCUMENTS," filed on Mar. 30, 2011, no allowed, which is a continuation of U.S. patent application Ser. No. 12/113,140 of SCHOLTES et al., entitled "SYSTEM AND METHOD FOR NEAR AND EXACT DE-DUPLICATION OF DOCUMENTS," filed on Apr. 30, 2008, now U.S. Pat. No. 7,930,306, the entire disclosure of which is hereby incorporated by reference herein.

BACKGROUND OF THE INVENTION

1. Field of the Invention

The present invention generally relates to information management systems and methods, and more particularly to a method and system for detecting of duplicates and near-duplicates in electronic documents and/or content.

2. Discussion of the Background

Email collections, electronically stored documents, and the like, can include duplicate and near-duplicate messages and documents. These collections can be found on the Internet, in corporate Intranets, in other networks, stand-alone systems and also on off-line stored information carriers, such as CD-ROM, DVD, Write Once Read Many (WORM), Backup Tape, etc. For example, duplicates and near-duplicates can form 50% or more of the size of a collection.

These duplicates and near-duplicates are created for many reasons, such as the creation of slightly different versions of a document, different formats of a document (e.g., such as creation of a PDF from a Word file, text, HTML or RTF version of a document or email, EML version of a MSG, etc.), forwarded or copied and blind-copied emails, backups (e.g., tape, CD-ROM, DVD, Internet backups, Application Service Provider (ASP) backups, hosted archives, software service provider backups, etc.), copies to different devices (e.g., other computers, hand-held and other mobile devices, PDA's, etc.). Although such documents may have a format that changes in its binary form, different file properties (e.g., file name, file creation date, file access date, file modification date, file size, file access properties, etc.), and different document properties (e.g., title, author, date, routing, receiving time, category, custom properties, etc., which are sometimes over 100 for certain electronic objects), the actual textual content of such objects is often the same or slightly the same.

Accordingly, such duplicates and near-duplicates create huge problems in applications where large volumes of electronic data have to be searched and reviewed by humans, such as during electronic discovery (e-discovery), law enforcement activities, fraud investigations, security activities, intelligence activities, due diligences, mergers and acquisitions, business intelligence activities, historical research, contract management, project management, human research management, and the like. For example, when there are a large number of duplicate or near-duplicate documents, it takes longer to find the latest version of a given document. In addition, there is a significant risk that an old version will be found and used. Further, for translating documents, the cost of translating duplicate and near-duplicate documents can be very expensive and time consuming. For example, if 50% of the documents are exact or near-duplicates, then the human review of such documents (e.g., often done by specialized lawyers, scare investigators or intelligence analysts, etc.) may not only cost twice as much, but it will also cause undesirable delays, the missing of deadlines, and the like, which can often times break a deal. Therefore, exact and near-duplicates must be removed or at least be detected and optionally moved to the background for increasing document processing efficiency.

Further, deleting and removal of exact-duplicates and near-duplicates reduces storage requirements, and resources needed to build indexes, run text-analytics (e.g., concept extraction, text-mining, optical character recognition, machine translation, speech recognition, document property extraction, file property extraction, language recognition, etc.) and process such documents.

Detecting exact-duplicates can be done reliably by using so-called hashing techniques. Such techniques can employ a combination of the document textual content, and/or properties or binary content that is hashed with a MD-5, SHA-1 or other suitable hashing algorithms. If two documents are exactly the same or if they have exactly the same document properties, then the resulting hash values also must be exactly the same. For example, one character or even one bit difference in a given document will trigger a very different hash code. In addition, an almost similar hash value does not guarantee that two documents are similar. In fact, this often means that the documents actually are completely different. Therefore, hashing cannot be used reliably to identify near-duplicates.

There are a number of algorithms and methods that do allow near-duplicate detection. Typically, such techniques are based on a comparison of a document or a sample of a document with all other documents. Such algorithms can be based on clustering techniques and typically are non-linear in both time and space, which means that if there are N documents, (N×N) calculations and an (N×N) memory will be required. For example, assume that 100 documents will take 10,000 calculation cycles to de-duplicate. For the next 100 documents, one needs 30,000 extra calculations, and the next 100 documents will require 50,000 more cycles, etc. For example, if there are 100,000 documents, the de-duplication of the last 100 documents can take 89,890,010,000 cycles. Since email and hard disk collections can include many millions of documents, such de-duplication processing is computationally unacceptable.

Accordingly, there is a need for a near deduplication algorithm that is linear in time and space. This means that given N documents, N calculations and an N sized memory can be employed. In this case, a collection of 100,000 documents only will require 100,000 calculations in total to de-duplicate. In addition, many conventional algorithms only support English and do not support other languages, require significant training, are not accurate enough, and do not allow for easily understandable user control of the outcome, for example, via the setting of precision and recall values, and measures of similarity.

In the view of the foregoing, there is a need for a system and method that allows the detecting of duplicate and near-duplicate emails (e.g., properties, email body and attachments) and electronic documents or other electronic content (e.g., referred to as objects), the tagging of such potentially duplicate and near-duplicate objects, and the automatic removal or visualization of the duplicate and near-duplicate objects when a object is presented to a end user through a computer system, and the like.

SUMMARY OF THE INVENTION

Therefore, there is a need for a method and system that addresses the above and other problems with conventional document processing systems and methods. The above and other problems are addressed by the exemplary embodiments of the present invention, which provide a method and system for linear, user-adjustable, multi-lingual and efficient detection of duplicate and near-duplicate document groups, and the linking of duplicate and near-duplicate documents to each other via an Extensible Markup Language (XML)-wrapper data structure. The XML-wrapper data structure is then used to remove duplicate and near-duplicate documents or to present duplicate and near-duplicate documents to a user when a document it viewed. For each document in a collection, an XML wrapper file is created. In the XML wrapper file, every document gets a unique number (e.g., a sequential number, a MD-5, SHA-1, a hash value, etc.). All documents are full-text indexed, for example, using any suitable program, such as ZyIMAGE or another full-text indexer, and the like. After the indexing step, it is possible to search on keywords. The indexer can employ a quorum search (e.g., a ZyIMAGE quorum search). Quorum operators are used to search for a specified number of terms within a search statement, such as M of {term 1, term 2, ... term n}. For example, a search query could be "2 of {history, English, social studies, French, Dutch, German}". Such a search query will provide any document that contains at least 2 of the terms between the brackets. It is also possible to use wildcard or Boolean expressions as the terms. By adding more terms, one will get a larger recall. By increasing the minimally required number M of found terms, one increases the precision. For every document, either the full text or a user definable selection from the textual component of the documents are taken and the N most frequent or the N first unique words in this text are determined and used to formulate a quorum search to find at least M (<=N) of the N words. It is possible to filter the document input by removing non-relevant words, such as numbers, keyfields, document properties, file properties, optical character recognition errors, noise words, and the like. Users can set the N and M parameters. By default N is chosen at 75% of the number of the most frequent words in the text selection of the documents (e.g., a couple of pages or a percentage of the document size, but other options are also possible), and M is set to 75% of N. It is also possible to set N as the N first unique words from a document. This will be computationally a bit faster, but less accurate. The size of M may be set as a precision parameter of the file size and N may be set using the recall parameter. With a large precision value M, few documents will be returned, but with many matching words. A large recall value will yield a small M so that more documents will be returned. There is a delicate relation between recall and precision in retrieving information from the index. Searching with a large precision is typically employed to find relevant information, but with one or more documents being missed (e.g., in the case of a journalist trying to find background information for a story, etc.). Searching with a large recall value is typically employed to find all documents related to a certain topic (e.g., in the case of a lawyer needing to find every piece of evidence in a court case, etc.). The XML wrapper of the source document can be tagged with the unique identification numbers of the documents that match the quorum search. The unique identification numbers are sorted in order of relevancy with the closest matching documents first, the next closest matching documents second, etc. The resulting sets of related documents can be used for various actions, such as the automatic removal or moving of duplicate and near-duplicate documents. Based upon user specified document properties, the "best" document can be kept (e.g., never delete a duplicate or near-duplicate the email from a sender, only from receivers, always keep the latest version, etc.). It is also possible to show related document when a document is viewed in an information access system. For examples, if there are links to duplicate or near-duplicate documents, show an alert that there are such documents, by clicking on the alert, the user can see the related documents or show similar documents parallel to each other, delete or move them interactively, and the like.

Advantageously, the novel method and system provide for a computational linear behavior. For example, to de-duplicate a set of N documents, only N calculations and an N sized memory can be employed. Accordingly, it is not necessary to compare every document with every other document, which results in N×N calculations and an N×N memory, as with conventional systems and methods. Thus, the novel method and system much faster than conventional systems and methods. Further advantages of the novel method and system include (i) recognizing exact and near-duplicates based upon full-text, (ii) users being able to set a understandable measure of similarity to determine near and exact-duplicates, (iii) language and domain independence, wherein the novel method and system can be easily tuned by non-skilled end users for a particular language, domain or boiler plate documents, for example, by adopting a noise word list, (iv) the novel method and system works well with text that is not (e.g., linguistically) perfect or that contains errors (e.g., text that originates from an automatic optical character recognition (OCR) or speech recognition process, for transcripts of phone records or other non-perfect text streams, etc.), (v) the novel method and system allows for automatic and manual de-duplication (e.g., an automatic computer process can perform a first very rough de-duplication pass to remove the very clear duplicates, such as documents that are 99.99% the same, etc.) and for the other potentially duplicate documents to be reviewed by human reviewers, and the like.

Accordingly, in exemplary aspects of the present invention there is provided a system, method, and computer program product for identifying near and exact-duplicate documents in a document collection, including for each document in the collection, reading textual content from the document; filtering the textual content based on user settings; determining N most frequent words from the filtered textual content of the document; performing a quorum search of the N most frequent words in the document with a threshold M; and sorting results from the quorum search based on relevancy. Based on the values of N and M near and exact-duplicate documents are identified in the document collection.

Still other aspects, features, and advantages of the present invention are readily apparent from the following detailed description, by illustrating a number of exemplary embodiments and implementations, including the best mode contemplated for carrying out the present invention. The present invention is also capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The embodiments of the present invention are illustrated by way of example, and not by way of limitation, in the figures of the accompanying drawings and in which like reference numerals refer to similar elements and in which.

DETAILED DESCRIPTION OF THE PREFERRED EMBODIMENTS

Figure 1:
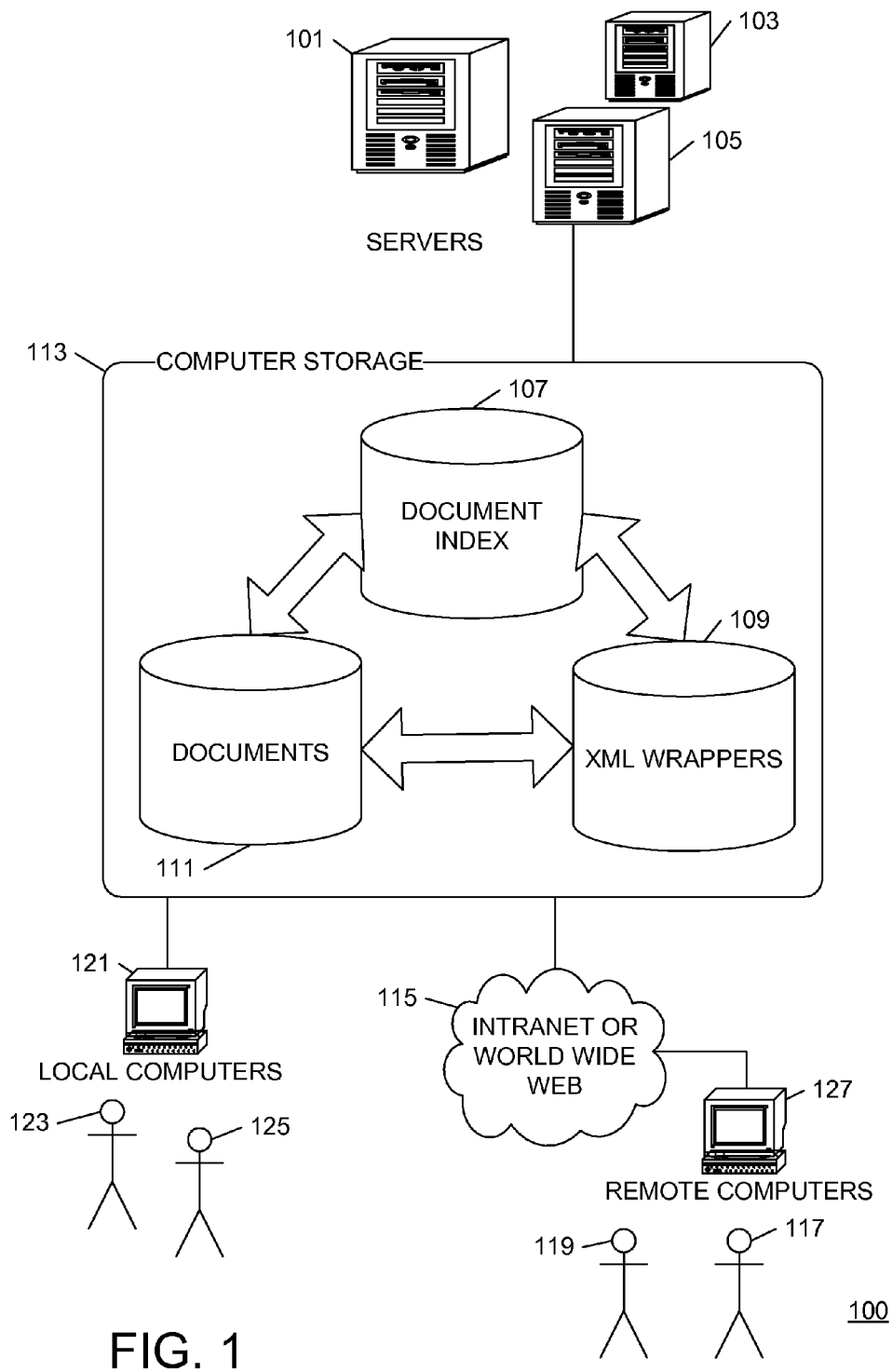
FIG. 1 illustrates an exemplary near and exact de-duplication system.

Referring now to the drawings, wherein like reference numerals designate identical or corresponding parts throughout the several views, and more particularly to FIG. 1 thereof, there is illustrated an exemplary near and exact de-duplication system 100. In FIG. 1, generally, the near and exact de-duplication system 100 provides for detecting, labeling, manual and automatic de-duplication of exact and near-duplicates. The system 100 includes, for example, a document storage 113 (e.g., a computer storage device, etc.) including one or more document collections 111, one or more document indexes 107 and one or more Extensible Markup Language (XML) wrapper collections 109, accessed through one or more servers 101, 103 and 105. The system 100 can be used for indexing, determination of unique document identifiers, the determination of the duplicates and near-duplicate document groups, and the automatic removal, moving or labeling of duplicate documents. One or more local computers 121 can provide connectivity to one or more users 123 and 125, for example, via a local-area network (LAN), and the like. Similarly, one or more remote computers 127 can provide connectivity to one or more remote users 117 and 119, for example, via the Internet, an Intranet, a wide-area network (WAN) 115, and the like. Accordingly, the computers 121 and 127 connect to the document storage 113 and to allow the one or more users 123, 125, 119 and 117 to manually or automatically search the document collection 111, view documents and document groups, delete or move duplicate documents or label them so the duplicate documents can be pushed to the background at search time, and the like.

The servers 101, 103 and 105 communicate with the computer storage 113 to create XML wrappers 109 for each document in the document collection 111, to create unique document identifiers for each document, to create a full-text document search index 107, to determine the exact and near-duplicates, to label the document XML wrappers 109 with the document identifiers of the duplicate document groups, and to automatically remove, move or label duplicate documents so they no longer show up in the search or future processing of the document collection 111.

As described above, the users 123, 125, 119 and 117 can search the document collection 111 by using the computers 121 and 127 connected over a LAN or the Internet or Intranet 115. When a document is found, the system can show duplicate document groups and the user can decide to keep them, to remove them, to move them to another computer-storage or to label them as definite duplicates. From then on, the search system can push documents that have been labeled as definite duplicates to the background, so users no longer see them and other automatic processes no longer suffer from the problems related to the needless processing of duplicate documents.

Figure 2:
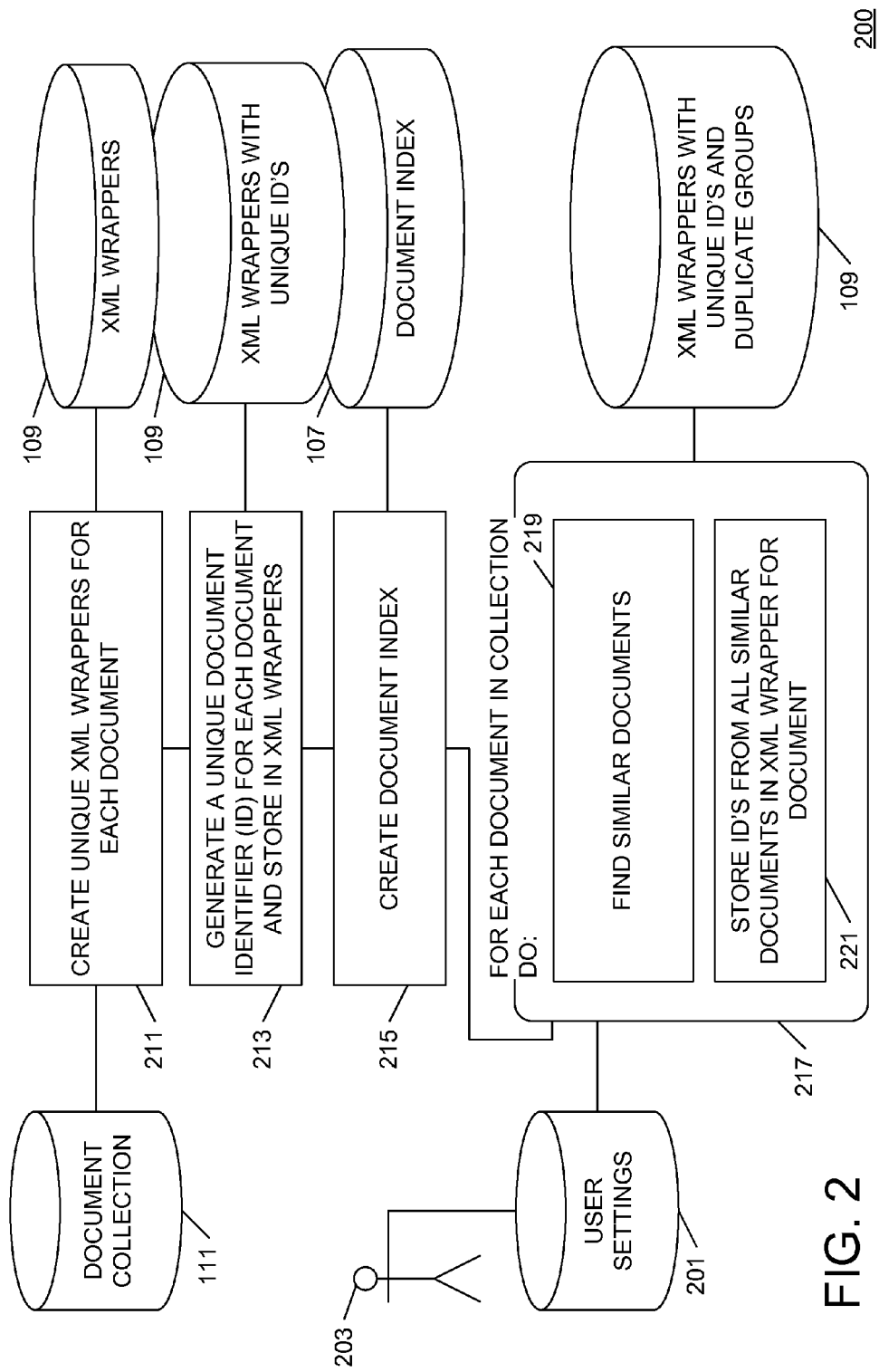
FIG. 2 is a flowchart of an exemplary process to identify and tag near and exact-duplicates.

FIG. 2 illustrates is a flowchart of an exemplary computer process 200 performed by the exemplary near-and exact de-duplication system 100 to identify and tag near and exact-duplicates. In FIG. 2, at step 211, for each document from the document collection database 111, an XML wrapper document is created and stored in the XML Wrapper database 109. At step 213, for each document in the document collection 111, a unique document identifier (e.g., a unique sequential number, a MD-5, SHA-1, SHA-2, or SHA-128 hash value, etc.) is created. The unique identifier is stored in a label in the XML wrapper from the database 109 and that belongs to the document in the database 111. At step 215, a full-text search index is created for all documents in the document collection database 111 and for the linked XML wrappers in the database 109. The created full-text document index is stored in database 107. At step 217, user 203 settings are read from a database 201, which includes the preferences for the de-duplication process. At step 219, for each document in the document database 111, the document index database 107 is searched, and a set of duplicate documents and the unique document identifiers for the near and exact-duplicate documents are stored at step 221 in the XML wrapper documents of the database 109.

Figure 3:
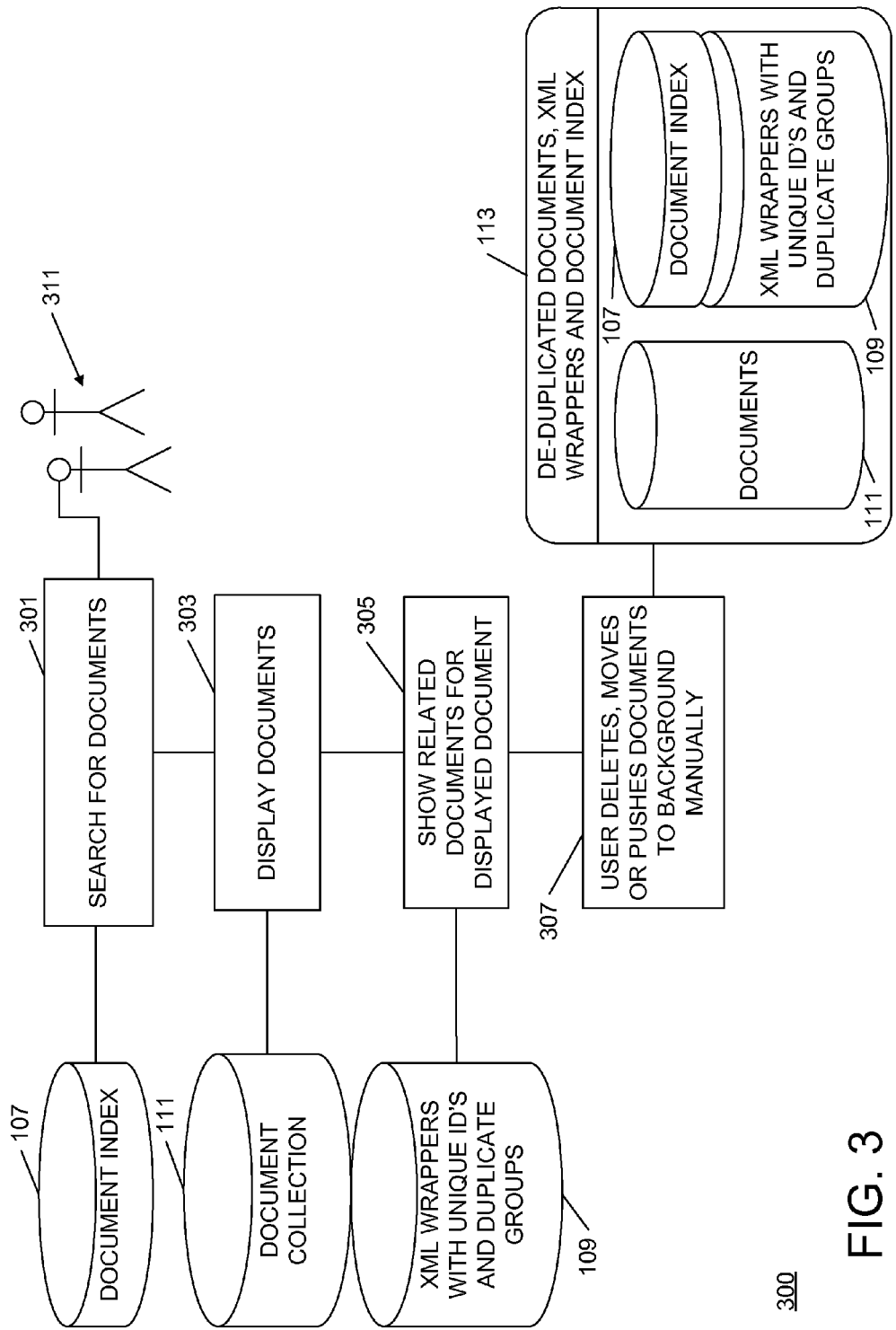
FIG. 3 is a flowchart of an exemplary process to search documents, display potential duplicates, and delete, move or push to the background duplicates.

FIG. 3 illustrates is a flowchart of an exemplary process 300, performed by the exemplary near-and exact de-duplication system 100, to manually search documents, display potential duplicates, and delete, move or push to the background the duplicates, for example, after a visual inspection of the documents. In FIG. 3, at step 301, users 311 can search the document index database 107 for documents. Documents read from the document collection database 111 can be displayed on a computer screen at step 303. Step 305 then reads the list of the duplicate document group from the XML wrapper related to the document from the XML Wrapper database 109. At step 307, the user is then allowed to delete, move or label one or more documents. When documents are deleted, the document is deleted from the document collection database 111, the corresponding XML wrapper is deleted from the XML wrapper database 109, and the document is removed from the document full-text index database 107. When documents are moved, the document and the XML wrapper are respectively moved from the document database 111 the XML wrapper database 209 to another computer storage device, and the document also is removed from the full-text document index 107. When a document is labeled as definite duplicate, corresponding information is stored in the XML wrapper linking to the labeled document. The labeled document can then be pushed to the background so as not to be further processed, for example, when a user searches the database or when another automatic process is executed against the de-duplicated documents.

Figure 4:
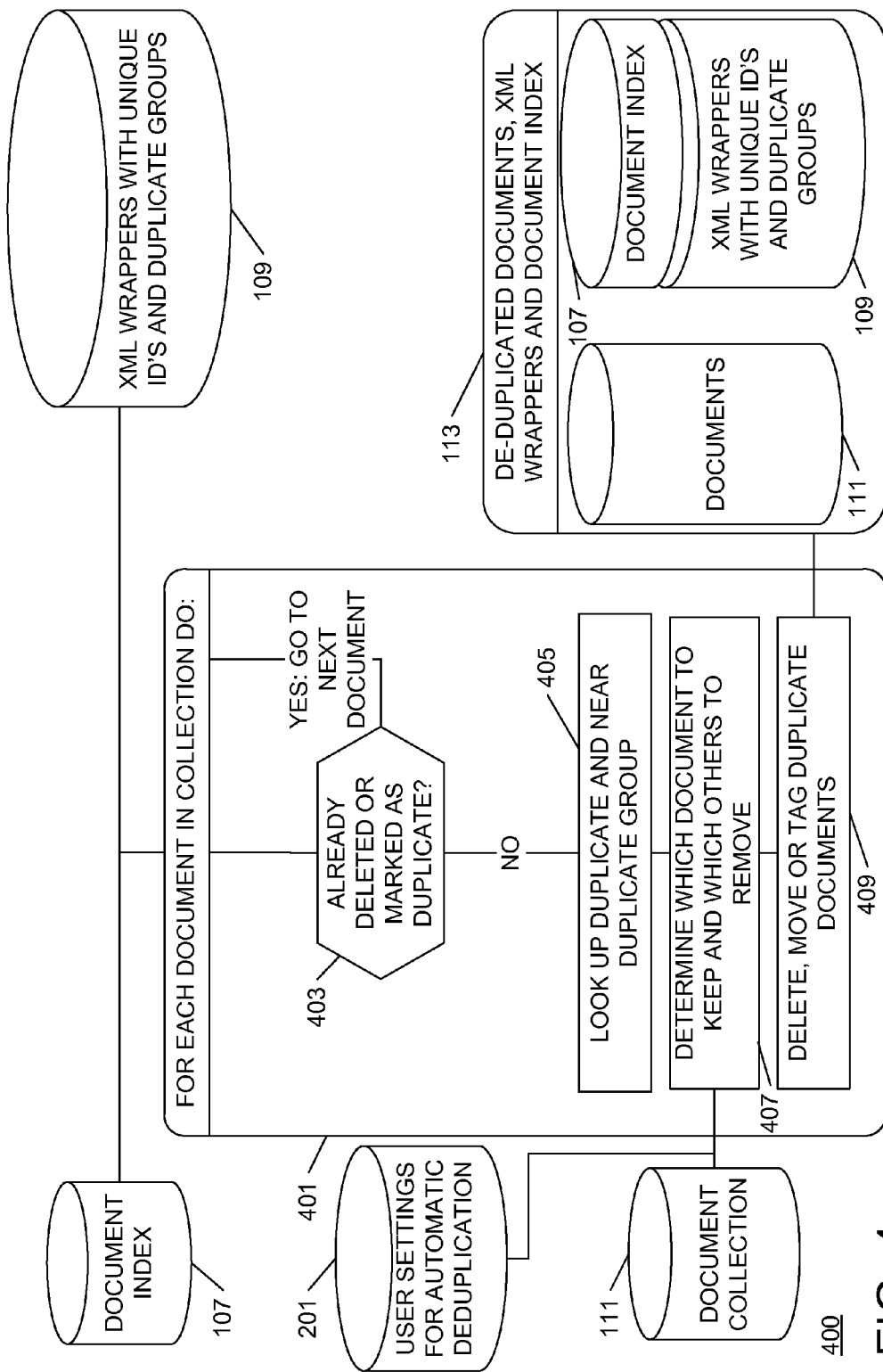
FIG. 4 is a flowchart of an exemplary process to automatically delete, move documents or tag documents as duplicate documents.

FIG. 4 illustrates is a flowchart of an exemplary process 400 to automatically delete, move documents or tag documents as duplicate documents after which they can be pushed to the background at search time. In FIG. 4, step 401 traverses the list of all documents in the document index 111. For each document, the XML wrapper is read from the XML wrapper database 109. Step 403 determines if a document is already deleted or marked as definite duplicate, and if this is the case, the document is skipped and step 401 continues with the next document. Otherwise, step 405 determines which document to keep and which to remove, depending on the user settings from the user setting preferences database 201 for automatic de-duplication database. Example settings can provide that step 407 (i) only keeps a document having the latest date and time; (ii) only keeps a document from a given sender (e.g., in the case of an email, letter, etc.) and not from all the receivers; (iii) keeps the documents from user A first, then keep the documents from user B, then from user C, etc; (iv) only keeps the document from location A (e.g., headquarters, geographic location, etc.), and the like. Any suitable selection criteria and rules can be employed. To complete the processing, step 409 removes, or moves the duplicate documents or tags the documents as definite duplicates in the computer storage 113.

Figure 5:
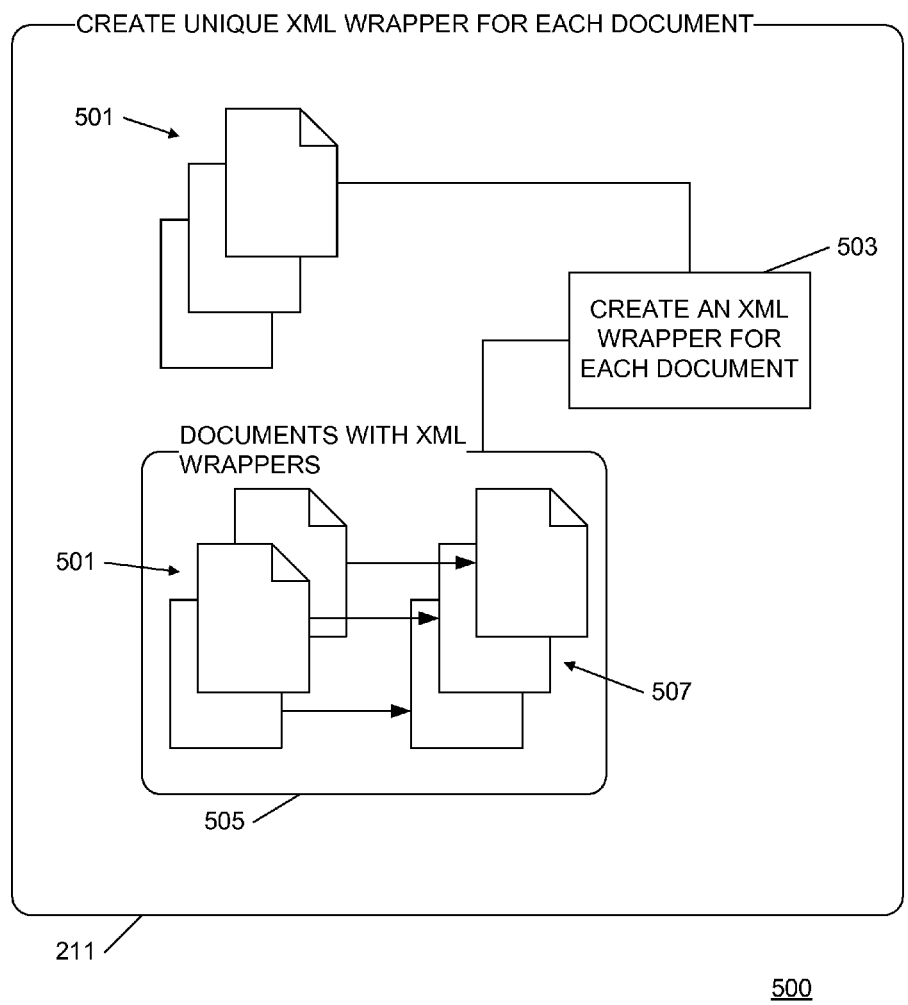
FIG. 5 is a flowchart of an exemplary process to create an Extensible Markup Language (XML) wrapper for each document in a document collection.

FIG. 5 illustrates is a flowchart of an exemplary process 500 to create an XML wrapper for each document in a document collection. In FIG. 5, process 211 creates for each document 501 a unique XML wrapper 507 at step 503 and which is linked to the document 501 to form linked documents 505 and which information is stored in the computer storage of 113.

Figure 6:
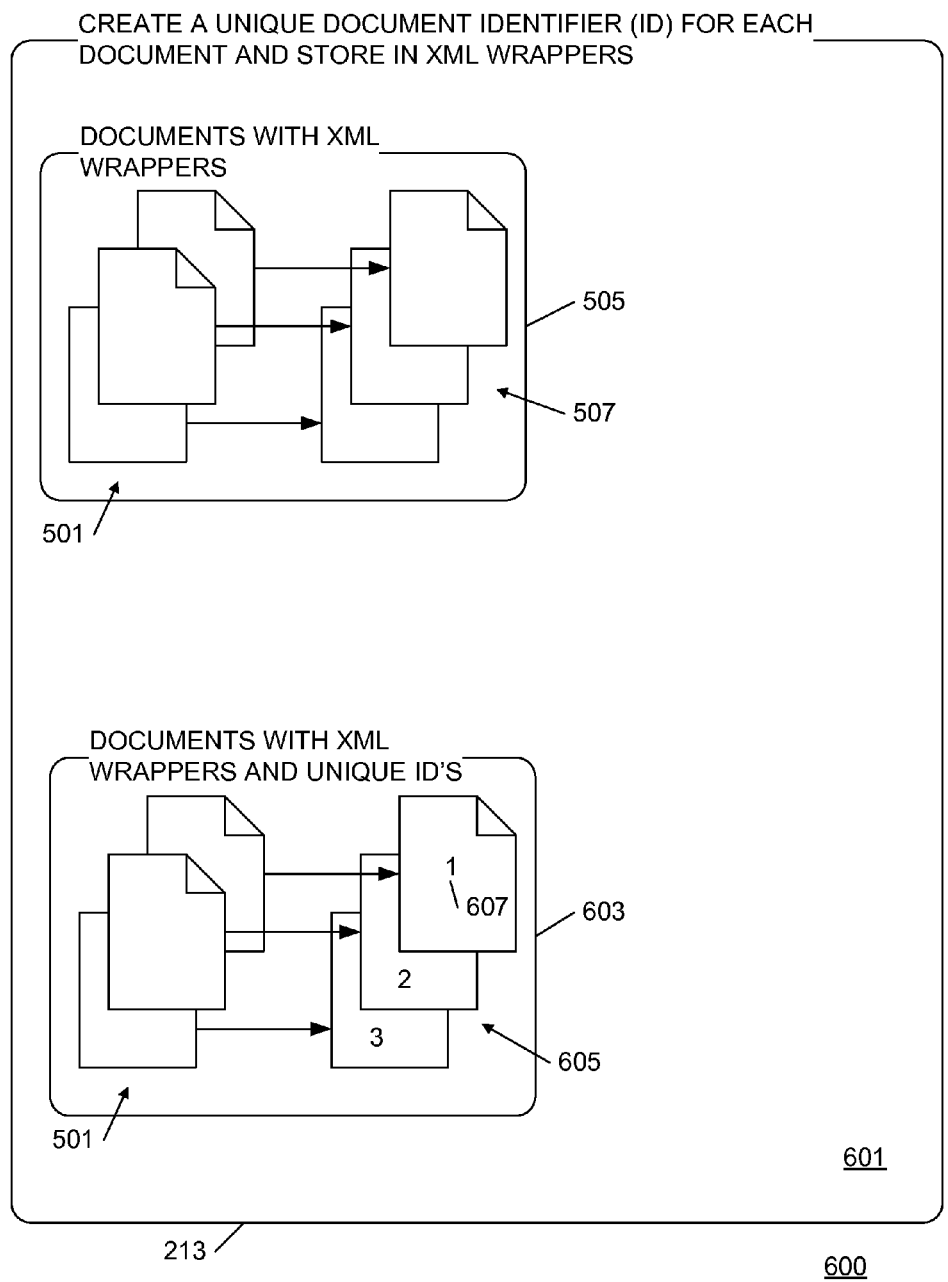
FIG. 6 is a flowchart of an exemplary process to create a unique identifier in each XML wrapper that belongs to each document in a document collection.

FIG. 6 illustrates is a flowchart of an exemplary process 600 to create a unique identifier in each XML wrapper that belongs to each document in a document collection. In FIG. 6, process 213 creates a unique document identifier for each document and stores this value in a label in the XML wrapper 605. For each document and XML wrapper in 505, a process step 601 creates in the corresponding XML wrapper 507, a unique identifier 607, and which is stored in the XML wrappers 605 and linked to the documents 501 as shown in 603.

Figure 7:
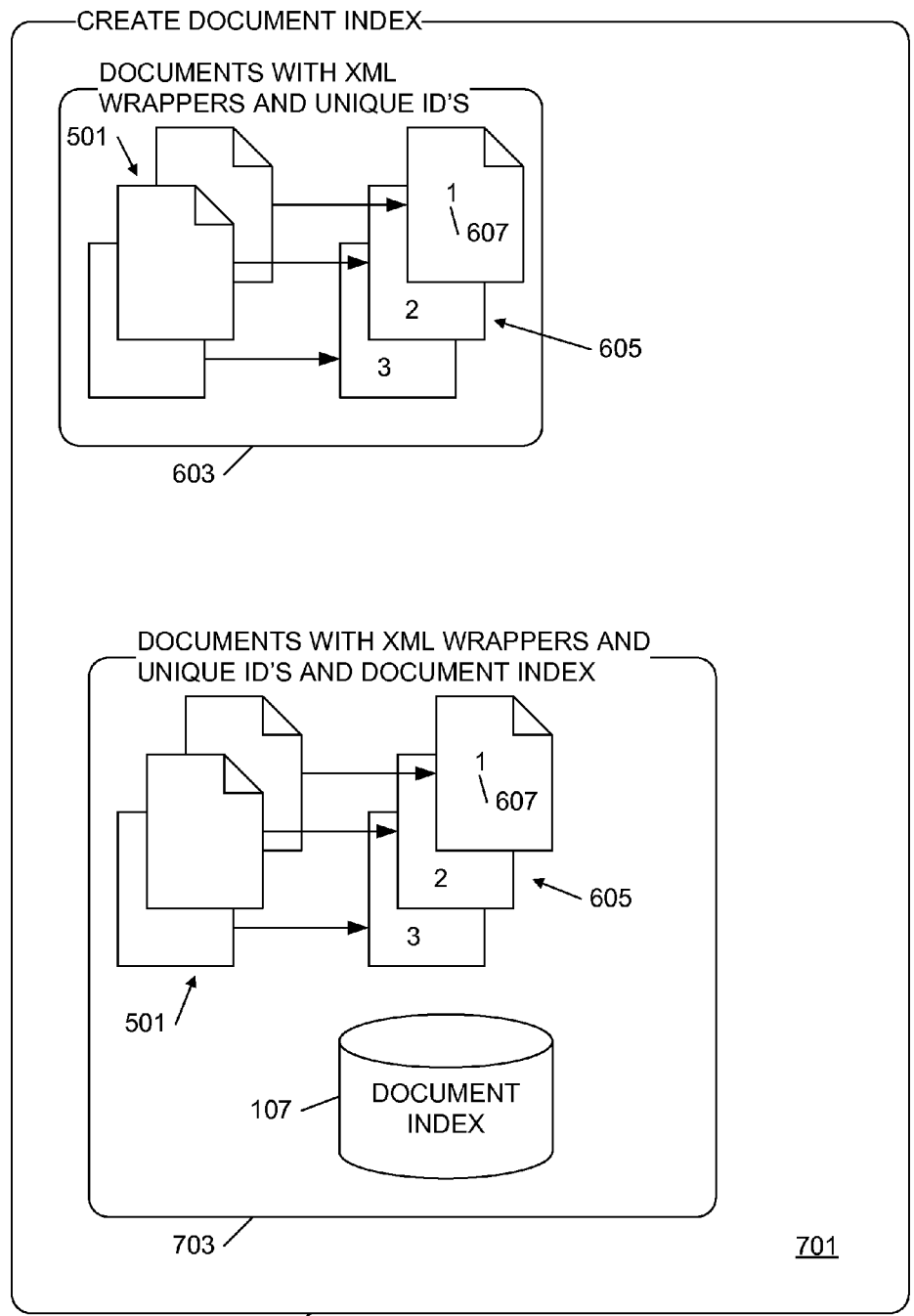
FIG. 7 is a flowchart of an exemplary process to create a document index for full-text search on each document in a document collection.

FIG. 7 illustrates is a flowchart of an exemplary process 700 to create a document index for full-text search on each document in a document collection. In FIG. 7, in process 215, the documents 501 with XML wrappers 605 having the unique identifiers 607 are used by a process step 701 to create a full-text search index for the entire collection 603. The results can be stored in database 703 which includes the documents 501, the XML wrappers 605, and a full-text document index database 107.

Figure 8:
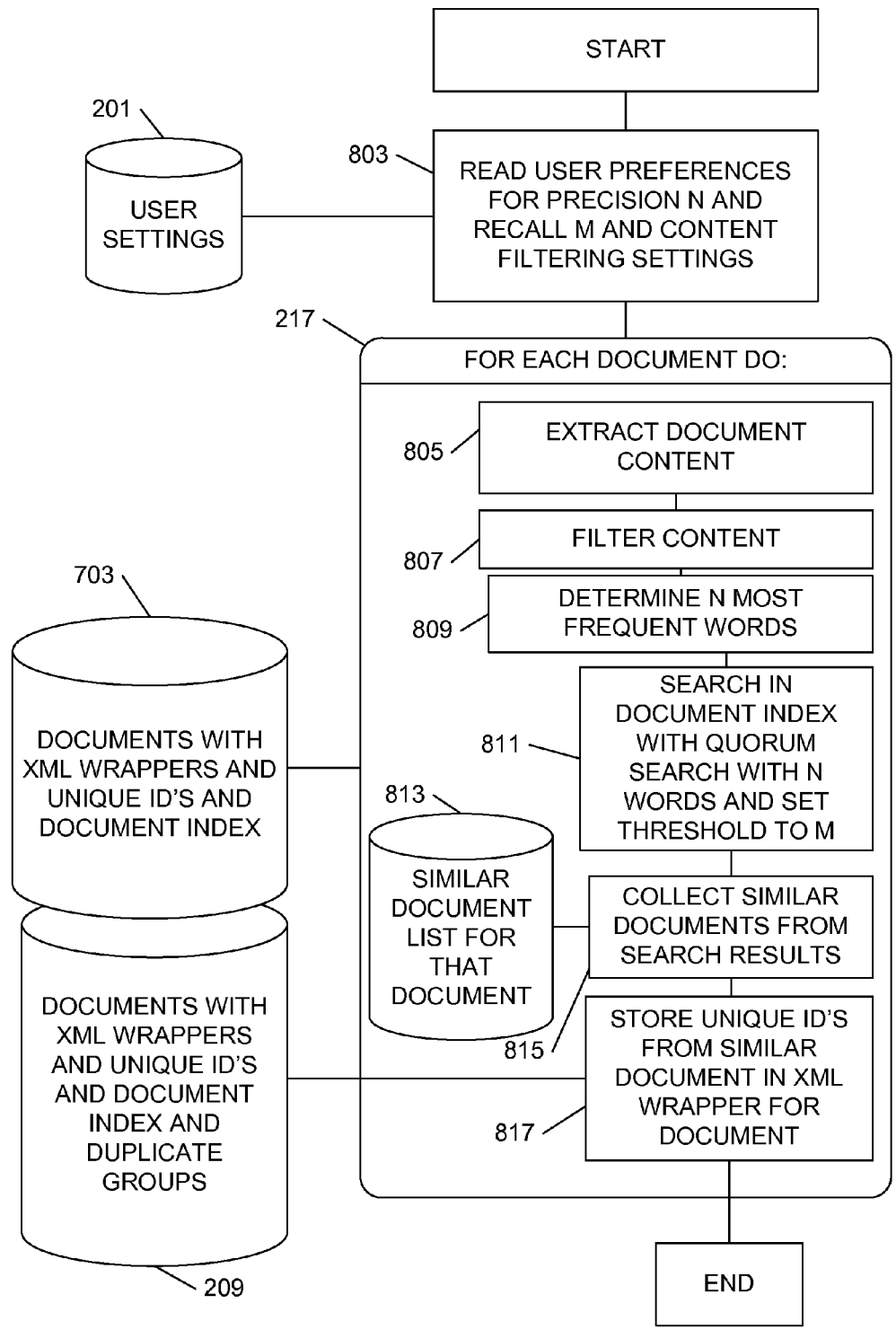
FIG. 8 is a flowchart of an exemplary process to identify near and exact-duplicates for a document and store document identifiers of such documents in the XML wrapper for the document.

FIG. 8 illustrates is a flowchart of an exemplary process 800 to identify near and exact-duplicates for a document and store the document identifiers of such documents in the XML wrapper for that document. In FIG. 8, after initializing all suitable settings, step 803 reads user preferences for a precision value N and a recall value M and content filtering settings for text filtering options, such as filtering of numbers, keyfields, noise words, optical character recognition, etc., from the user settings database 201. For each document, process 217, at step 805 reads the textual document content from a document and the XML wrappers in database 703. There can be various settings in the user settings database 201 to determine which text to read from the document in database 703. For example, it is possible to read the entire text from a document, or to read only the first x Kb (e.g., where x can be or any suitable number, etc.) or to read random sections of text or to read only the first x Kb (e.g., where x can be any suitable number) after certain key phrases or key words, and the like.

Numerous selections are possible, and step 807 filters the content from the textual component of the document depending on the user settings from the user settings database 201. Step 809 then determines the N most frequent words from the filtered textual component of the document. Step 811 executes a quorum search of the N most frequent words with a threshold M. N is calculated by taking a recall percentage value from the user settings in database 201 and then taking that percentage from the number of words that are in the list of most frequent words. For example, if the filtered text of a document results in 10,000 words, and the recall value is set at 75%, then N is 7,500 (i.e., 0.75*10,000). This is a more accurate method. It is also possible to use the N value as the N first unique words in the extracted text. For example, if 1000 words are read, of which 900 are unique, then N is set at 75% of 900=675. This method is faster, but less accurate.

M is calculated by taking the precision value as a percentage from the user settings in 201 and taking that percentage from N. For example, if the precision is set at 50% and N is 7,500, then M is set to 3,750 (i.e., 0.5*7,500). This will then result in the search for at least the occurrence of 3,500 individual words of the set of the 7,500 most frequent words. This is also called a quorum search, also indicated as M of {word-1, word-2, . . . , word N), where word-1 is the most frequent word, word-2 second frequent word, and word N the $N^{th}$ frequent word. Step 815 collects the results from the search results of step 811. These search results are sorted on relevancy.

Relevancy of a document can be determined in different ways, for example, a method to determine the relevancy of a documents is by taking the number of hits for the quorum search in a document and dividing that by the size of the document (e.g., in kilobytes of the text, or kilobytes of the actual file). However, in further exemplary embodiments, any suitable formulas can be employed for determining relevancy. The sorted list of related documents is temporarily stored in database 813. Step 817 then stores the sorted list from database 813 in the XML wrapper for the document from database 703 in the XML wrapper for that document, as represented by database 209.

Figure 9:
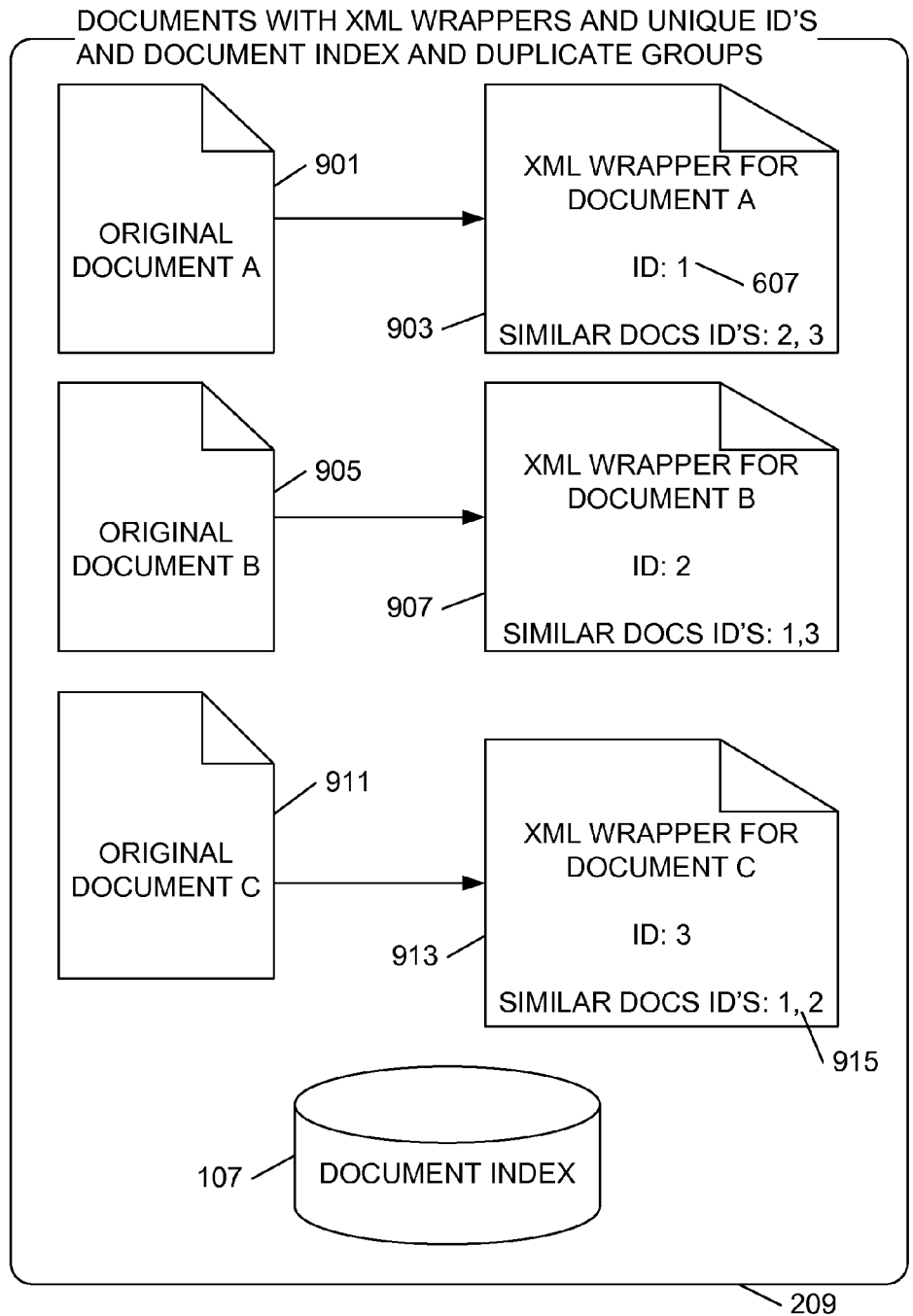
FIG. 9 is an exemplary data structure for XML wrappers that hold document identifiers and lists of near-duplicate document identifiers.

FIG. 9 illustrates an exemplary data structure 900, including the XML wrappers 903, 907 and 913 that hold document identifiers and lists of near-duplicate or exact-duplicate document identifiers and linked to the original documents 901, 905 and 911. In FIG. 9, in the database 209, for each document such as 901, 905 and 911, a unique XML wrapper exists, respectively 903, 907, and 913, and in each XML wrapper there is a unique document identifier 607 and a list 915 of documents that are similar in content, and therefore are potential exact or near-duplicates. The database 209 also stores the full-text search index, represented as the database 107.

Figure 10:
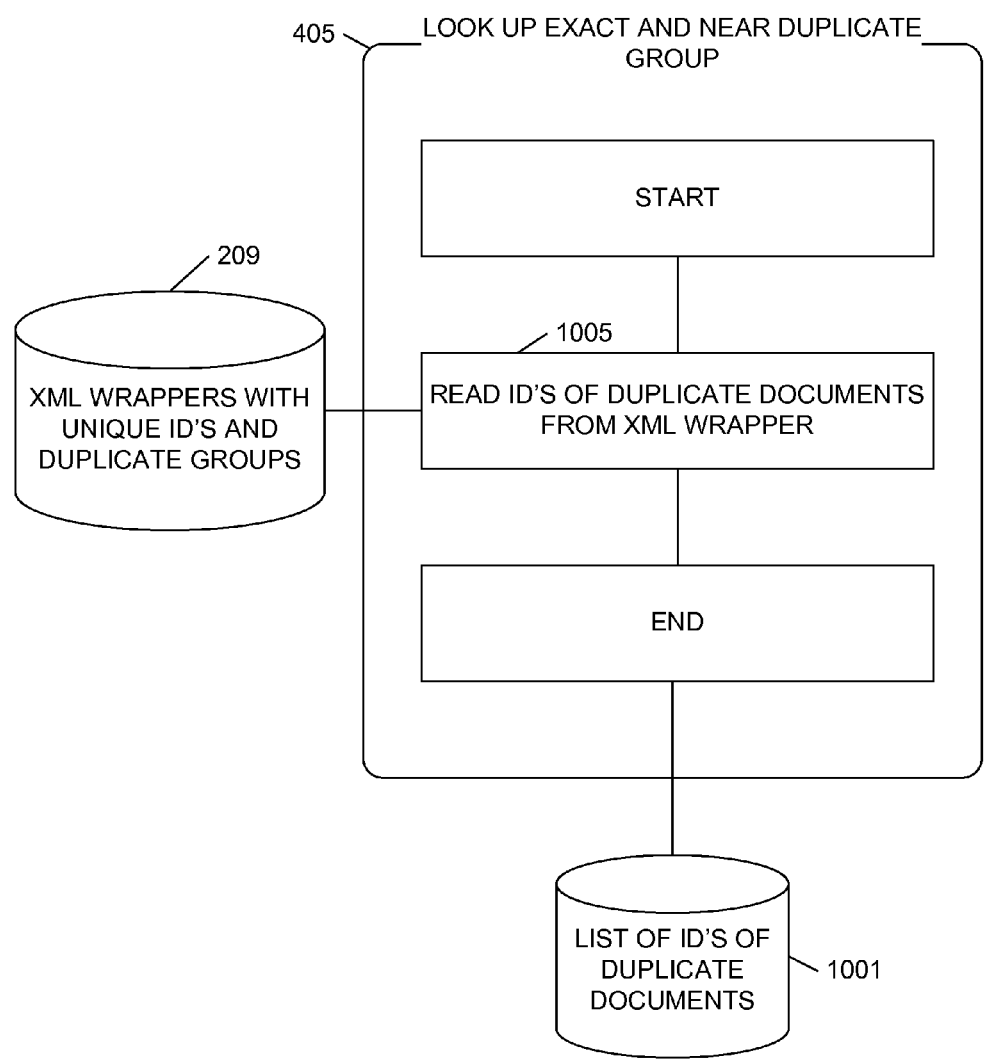
FIG. 10 is a flowchart of an exemplary process to lookup exact and near-duplicate groups from information in XML wrappers.

FIG. 10 is a flowchart of an exemplary process 1000 to lookup exact and near-duplicate groups from the information in the XML wrappers. In FIG. 10, process 405 looks up the near or exact-duplicate group for a document. Step 1005 reads the near or exact-duplicate groups from the database 209 holding the XML wrappers for a particular document and the resulting list of identifiers of the duplicate documents is temporarily stored in database 1001.

Figure 11:
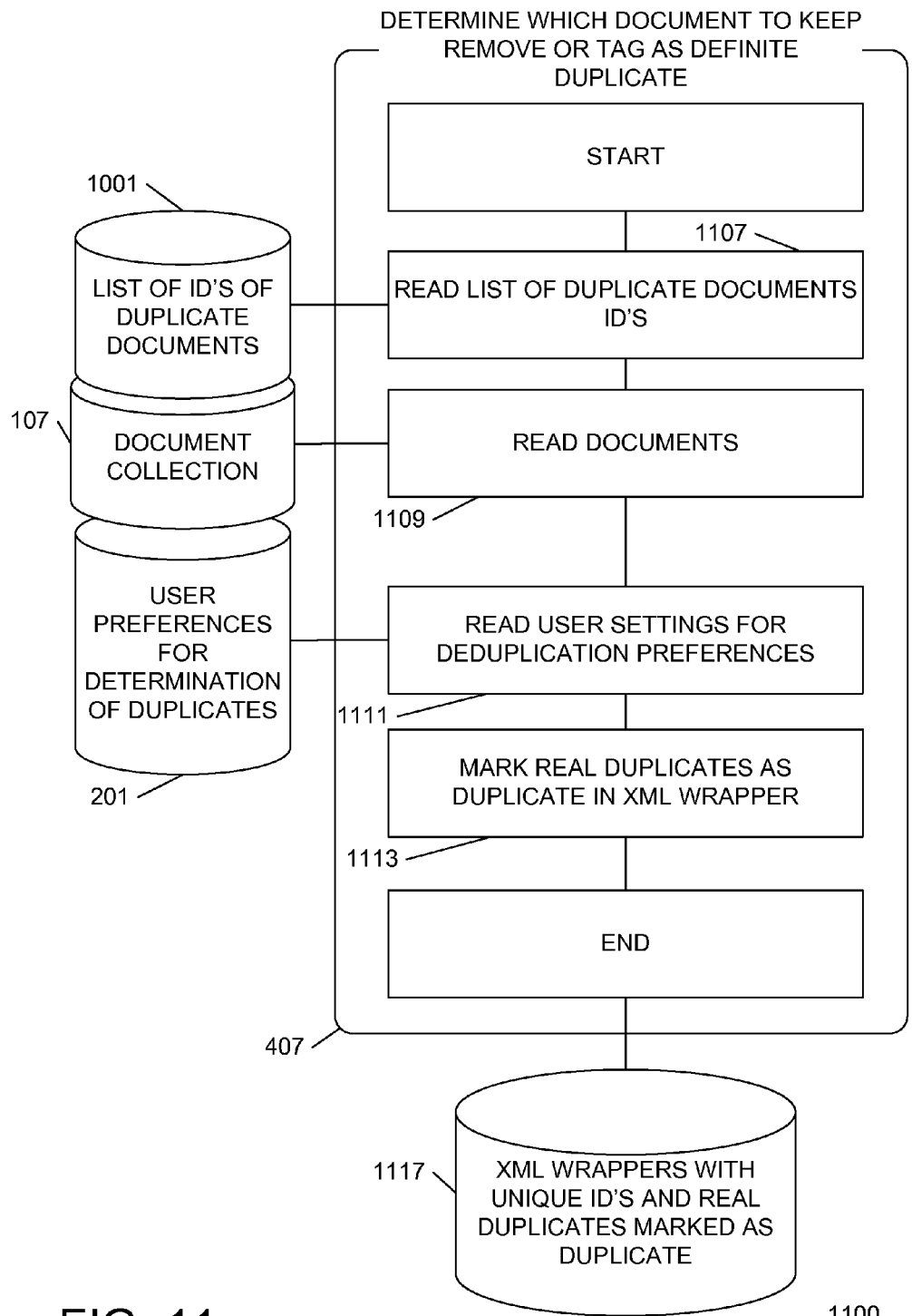
FIG. 11 is a flowchart of an exemplary process to automatically determine which documents to keep and which documents to remove, move or tag as duplicates.

FIG. 11 is a flowchart of an exemplary process 1100 to automatically determine which documents to keep and which documents to remove, move or tag as duplicates. In FIG. 11, step 407 to determine which documents to keep, remove or tag as definite duplicate from FIG. 4 is described in detail. Step 1107 reads the sorted list with the identifiers of the near and exact-duplicates from the database 1001. At step 1109, the document is read from database 107. Step 1111 reads from the user settings database 201 the user preferences for determining what are considered duplicate documents and what are not. Examples of such settings are discussed under the detailed description of FIG. 4. Step 1113 marks the determined real duplicate documents by setting, for example, a true or false value, and the like, in a corresponding tag of the XML wrapper for each duplicate document and is represented as database 1117.

Figure 12:
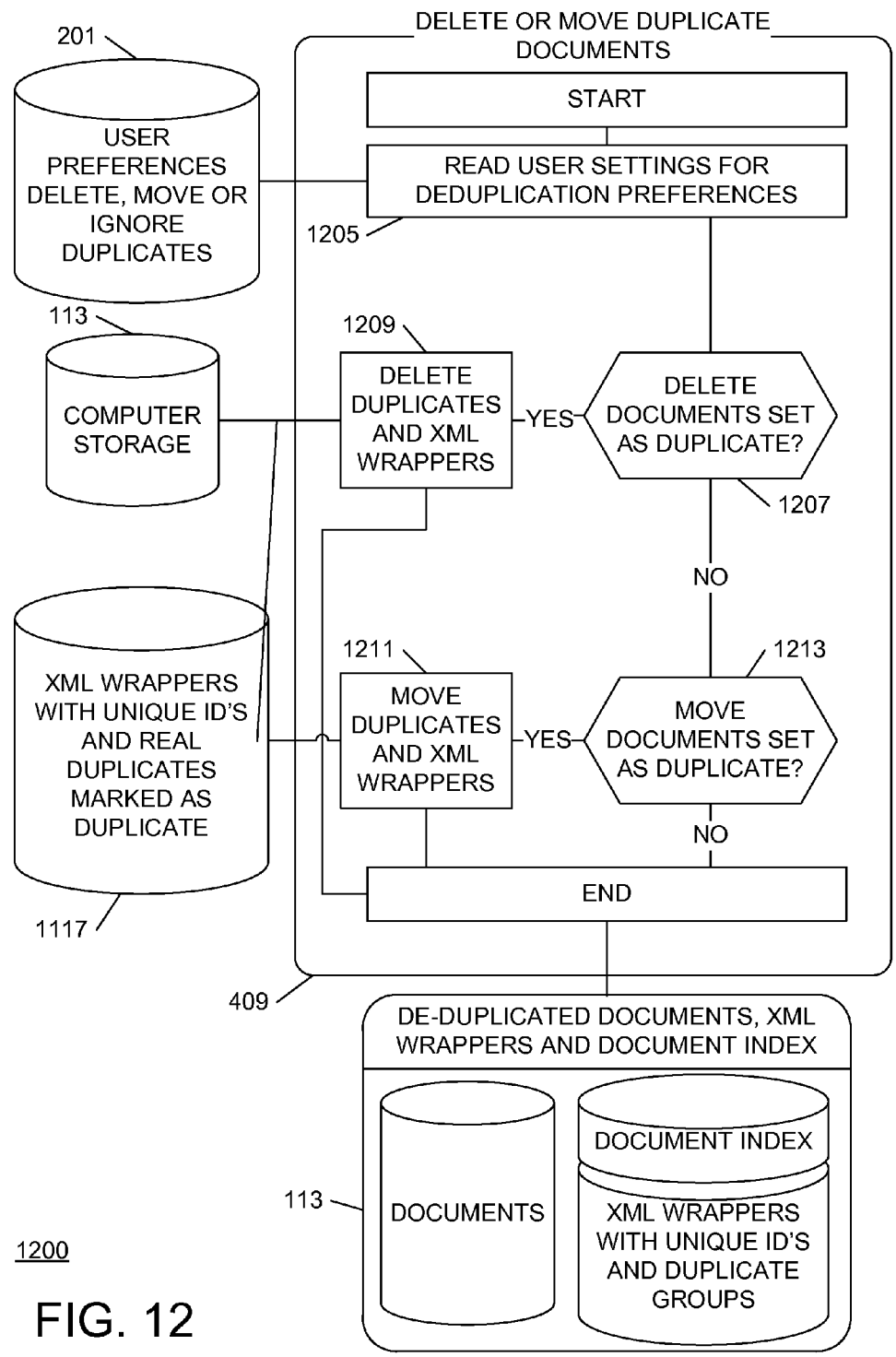
FIG. 12 is a flowchart of an exemplary process to delete or move duplicate documents.

FIG. 12 is a flowchart of an exemplary process 1200 to delete or move duplicate documents. In FIG. 12, step 409, as described with respect to FIG. 4, deletes or removes the documents that are marked as duplicates, depending on the settings in the user settings database 201. In step 1205, the settings are read and step 1207 determines if the documents that are marked as duplicates need to be deleted, and if so, step 1209 deletes the documents that are marked as definite duplicates from the computer storage 113, completing the process. Otherwise, step 1213 determines if the documents that are marked as duplicates need to be moved, and if not, the process is complete. Otherwise, step 1211 moves the documents that are marked as definite duplicates and the corresponding XML wrappers to another selected computer storage device, completing the process. The de-duplicated documents, XML wrappers and the document search index are then stored in the computer storage 113.

Figure 13:
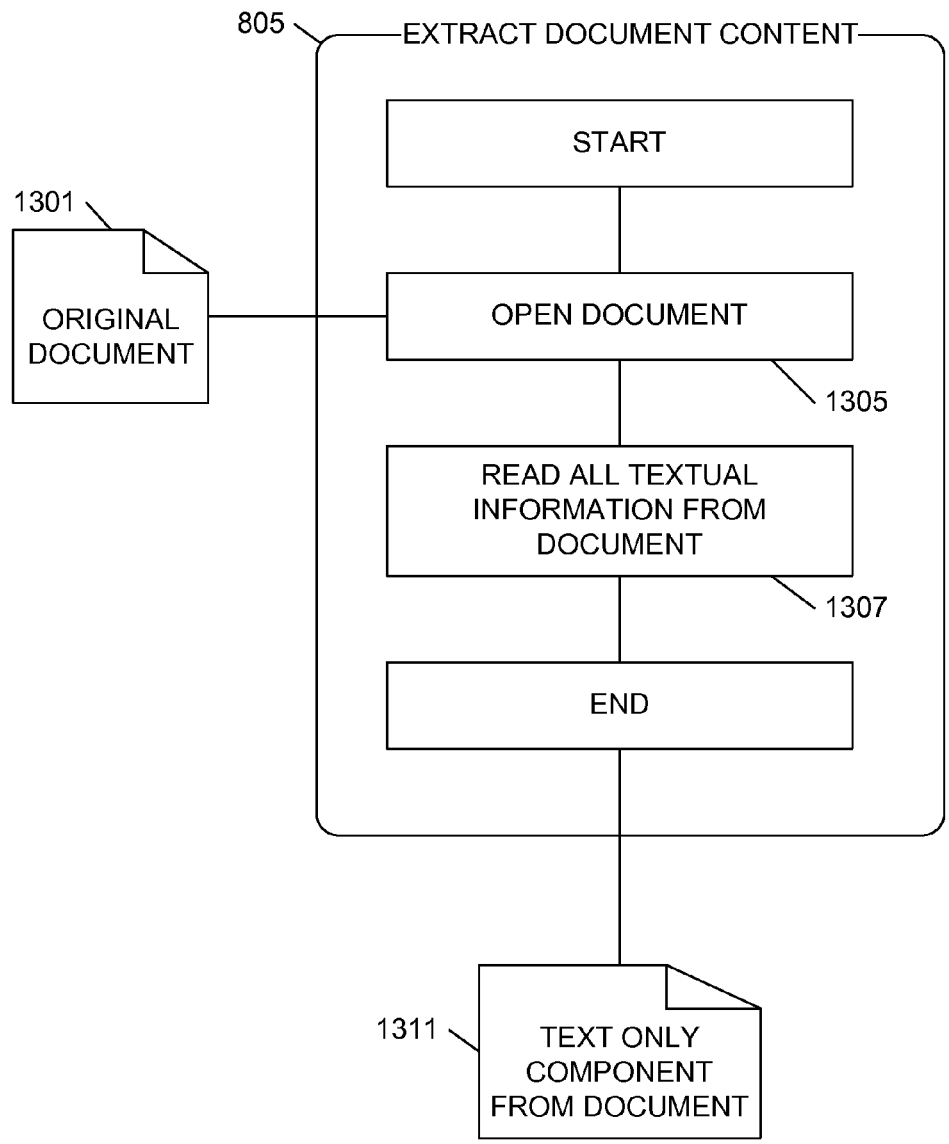
FIG. 13 is a flowchart of an exemplary process to extract document textual content.

FIG. 13 is a flowchart of an exemplary process 1300 to extract document textual content. In FIG. 13, step 805, as described with respect to FIG. 8, extracts the document content from document. Step 1305 opens an original document 1301, and step 1307 reads the textual component from the document 1301, for example, ignoring formatting, graphical information, and the like. The result is stored in a text-only component 1311 of the original document in 1301.

Figure 14:
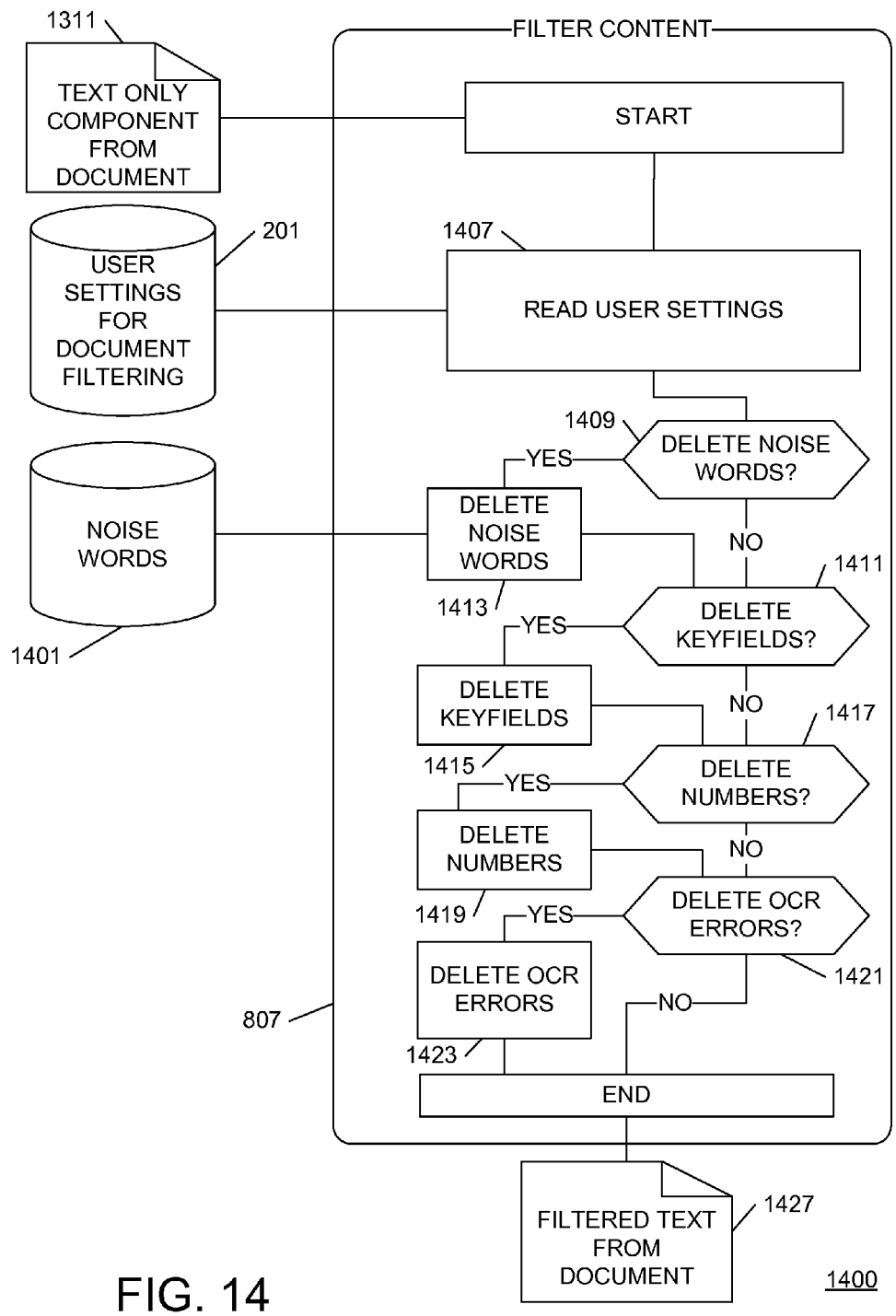
FIG. 14 is a flowchart of an exemplary process to filter textual document content.

FIG. 14 is a flowchart of an exemplary process 1400 to filter the textual document content. In FIG. 14, step 807, as described with respect to FIG. 8, filters the content of the text-only component 1311 of a document. Step 1407 reads the user settings for document filtering from the user settings database 201. Step 1409 determines if noise words need to be filtered, and if so step 1413 filters the noise words based on noise words database 1401. For example, noise words can include words that occur often (e.g., words, such as "the," "a," "an," etc," etc.) and that cannot be used to distinguish the content of documents properly. Otherwise, step 1411 determines if keyfield values and other meta-information (e.g., document properties, etc.) need to be deleted from the text. This is often the case for boiler plate documents or forms, and the like, which may contain many similar words, and which frequent occurrences thereof may undesirably influences the end result of the detection of the similar documents. Accordingly, such keyfields can be deleted from the text which is used to determine similar documents. Accordingly, step 1415 can remove the keyfields and other meta-information from a document. Otherwise, step 1417 determines if numbers (e.g., 0-9, etc.) need to be deleted, and if so step 1419 deletes the numbers from the text. Otherwise, step 1421 determines if optical character recognition (OCR) errors need to be removed by step 1423, and including, for example, recognition noise in a documents, such as "iiii . . . ," "xxxxxxxxxxxxxxxxxxx," random characters, non-words, and the like, that are the result of automatic OCR computer processes, and the like. The filtered text-only component 1427 from the document is the result, completing the process.

Figure 15:
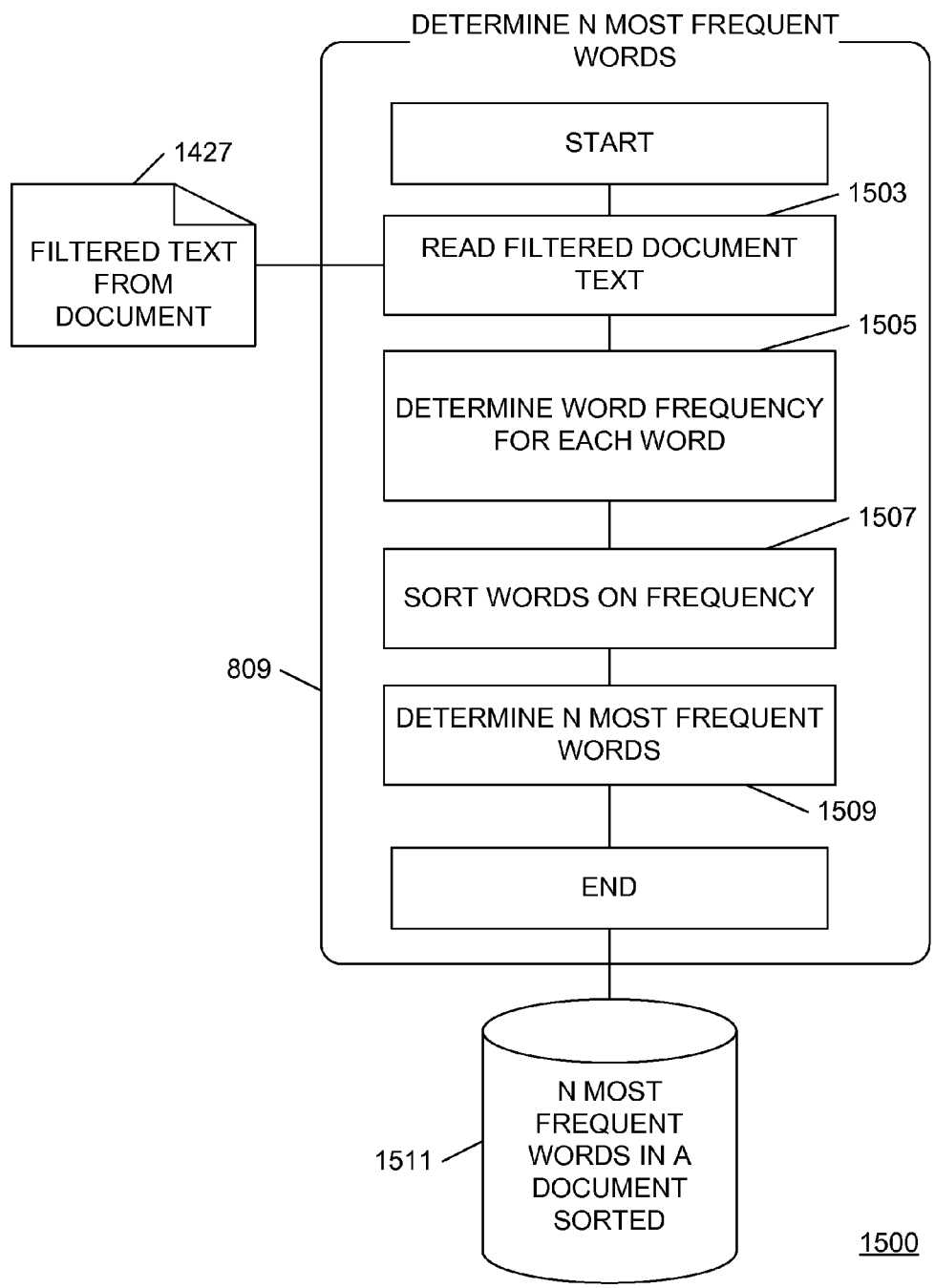
FIG. 15 is a flowchart of an exemplary process to determine the n most frequent words.

FIG. 15 is a flowchart of an exemplary process 1500 to search in the full-text document index with a quorum search of N words with threshold M. In FIG. 15, step 809, as described with respect to FIG. 8, determines the N most frequent words in a document. As noted above, it is also possible to use the value N as the N first unique words in the extracted text, but since this is a less accurate method, the preferred method is described with respect to the drawings. Step 1503 reads the filtered text-only component 1427 from a document and step 1505 then calculates the frequency for each word in the filtered text. Step 1507 sorts the words on frequency (e.g., highest frequency first) and step 1509 determines the N most frequent words. The results are stored in a temporarily database 1511, for example, with the sorted list of the N most frequent words in a document and with the most frequent word first in the list, completing the process.

Figure 16:
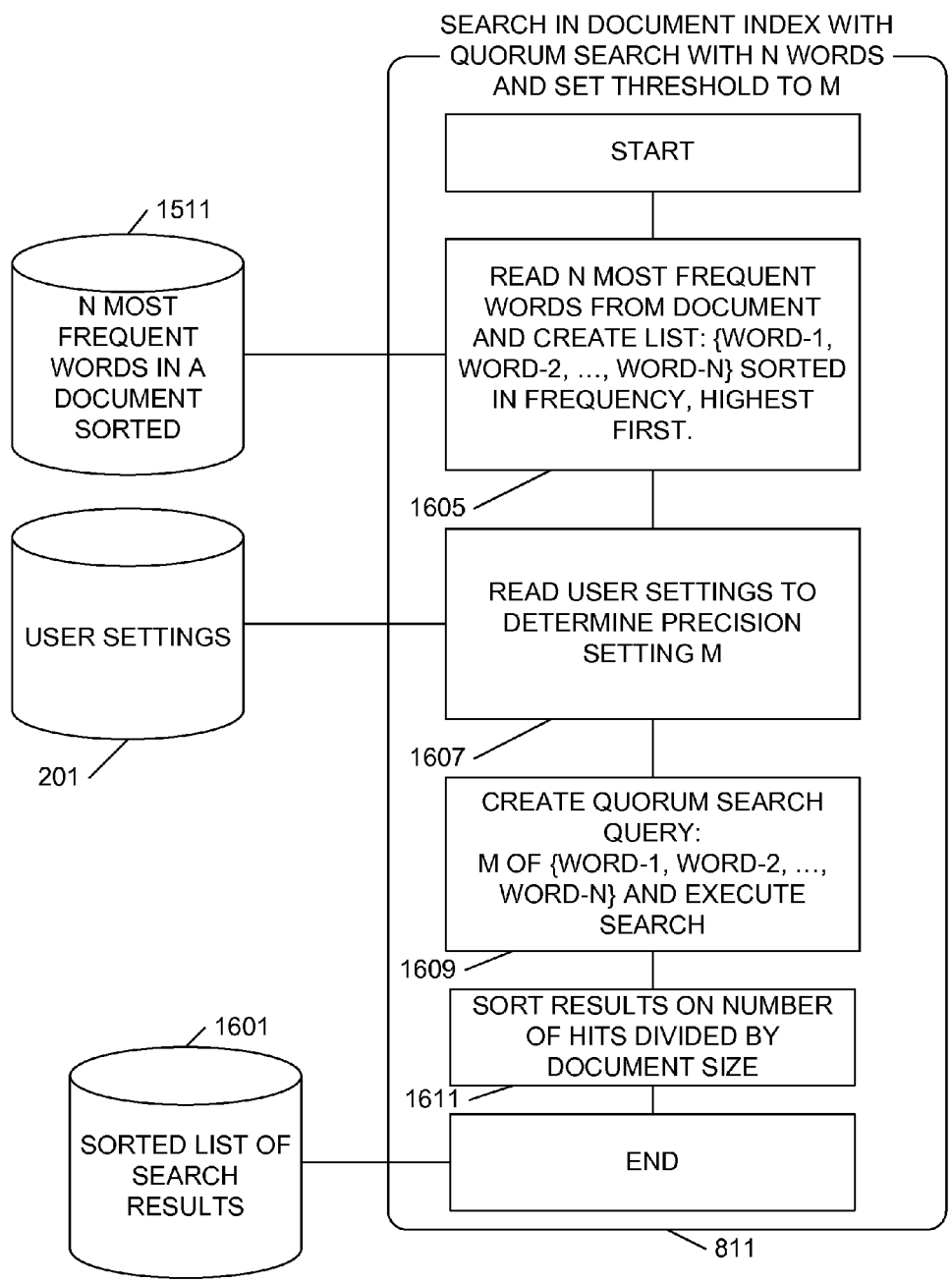
FIG. 16 is a flowchart of an exemplary process to search in a full-text document index with a quorum search of N words with a threshold M.

FIG. 16 is a flowchart of an exemplary process 1600 to search in the full-text document index with a quorum search of N words and with a threshold M. In FIG. 16, step 811, as described with respect to FIG. 8, performs the quorum search. Step 1605 read the list of the N most frequent words from the database 1511 and creates a list {word-1, word-2, . . . , word-N}, where word-1 is the most frequent word, word-2 the second most frequent word, . . . and word-N the $n^{th}$ most frequent word. Step 1607 reads the user settings for the recall percentage and the precision percentage, for example, as set by the user from the database 201. Step 1609 then executes a full-text quorum search of the N most frequent words with threshold M. N is calculated by taking the recall percentage value from the user settings in database 201 and then taking that percentage from the number of words that are in the list of most frequent words, as described with respect to FIG. 8. Step 1611 sorts the results from the quorum search based upon any suitable relevance ranking algorithm, for example, such as the number of hits divided by the size of the document or any another suitable relevance formula, algorithm, and the like. The sorted list of the search results (e.g., similar documents) is stored in a temporary database 1601, completing the process.

Figure 17:
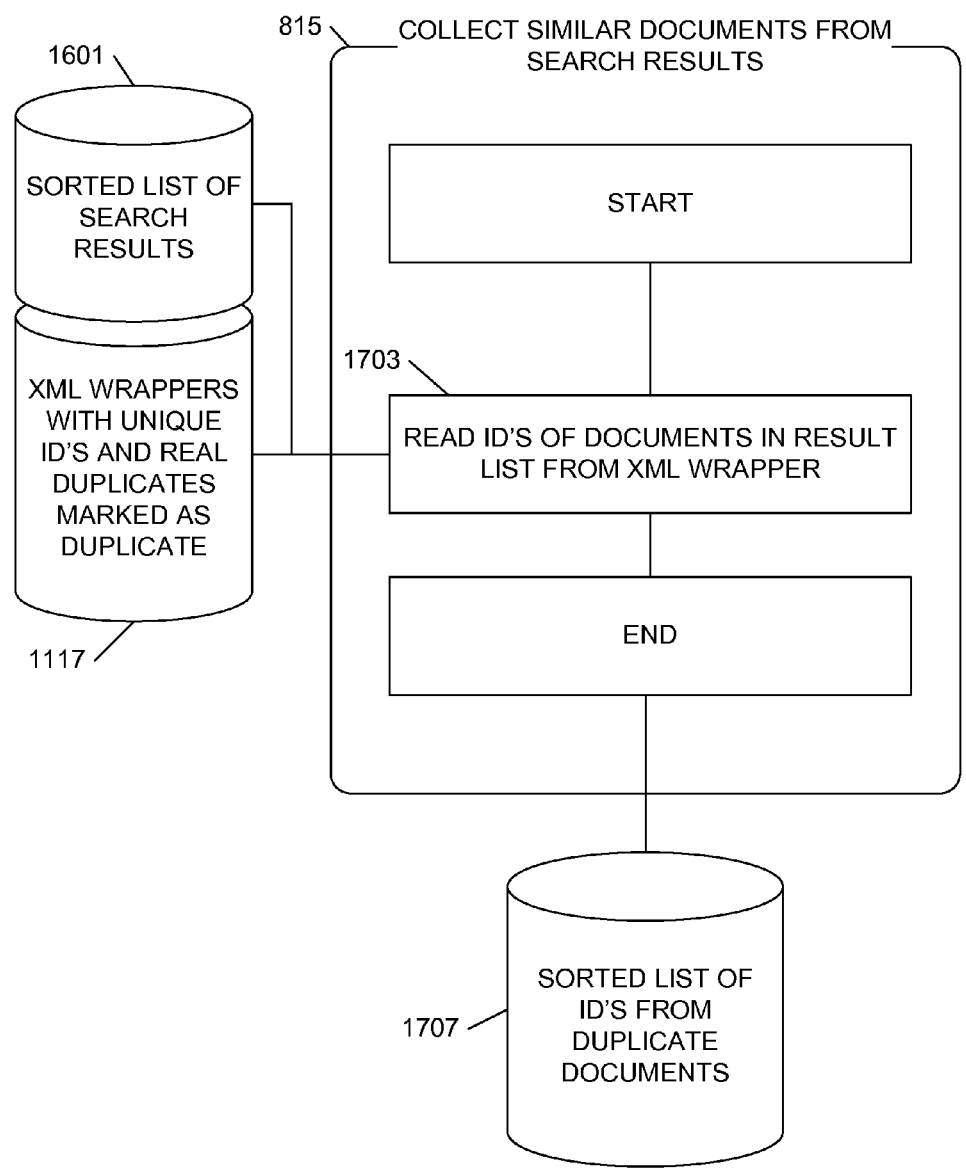
FIG. 17 is a flowchart of an exemplary process to collect similar documents from quorum search results.

FIG. 17 is a flowchart of an exemplary process 1700 to collect similar documents from the quorum search results stored in the database 1601. In FIG. 17, step 815, as described with respect to FIG. 8, collects the list of similar documents from the search results. Step 1703 reads the sorted list of search results from the temporarily database 1601, and reads the identifiers of the similar documents from the XML wrappers of the corresponding documents in the database 1117 and with the results stored in a sorted list of identifiers from near and exact-duplicates in a temporary database 1707, completing the process.

Figure 18:
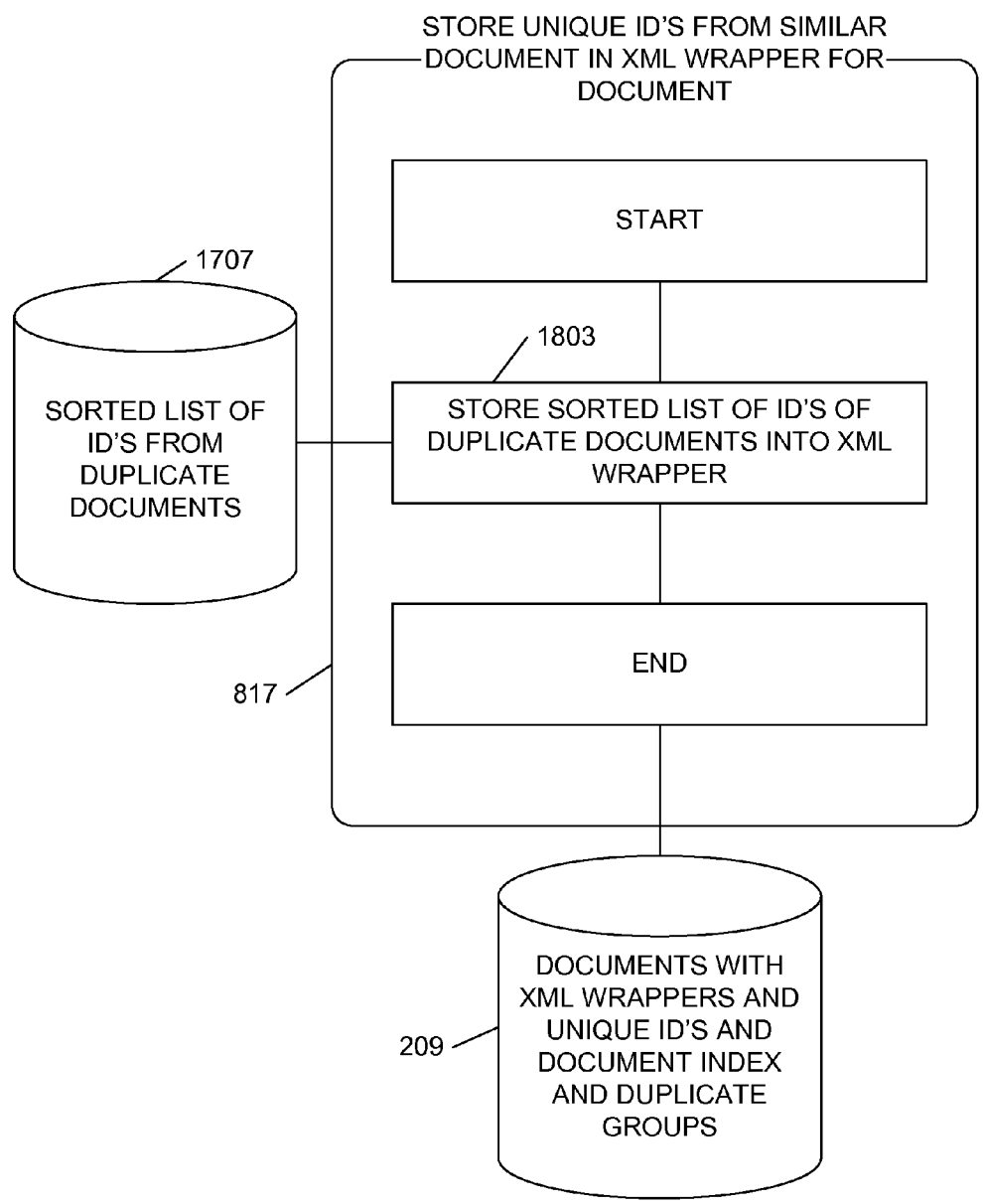
FIG. 18 is a flowchart of an exemplary process to store unique document identifiers from similar documents in XML wrappers for a particular document.

FIG. 18 is a flowchart of an exemplary process 1800 to store unique document identifiers from similar documents in XML wrappers for a particular document. In FIG. 17, step 817, as described with respect to FIG. 8, stores the unique document identifiers of the near and exact-duplicate documents in the XML wrappers for the corresponding documents. Step 1803 reads the sorted list of identifiers from the exact and near-duplicates from the temporary database 1707 and stores the sorted list of document identifiers (e.g., most similar first) in the assigned tag of the XML wrapper for that document. The results are stored in the database 209 that includes for each document an XML wrapper with the identifiers of exact and near-duplicates, the documents, and a full-text document search index, completing the process.

Figure 19:
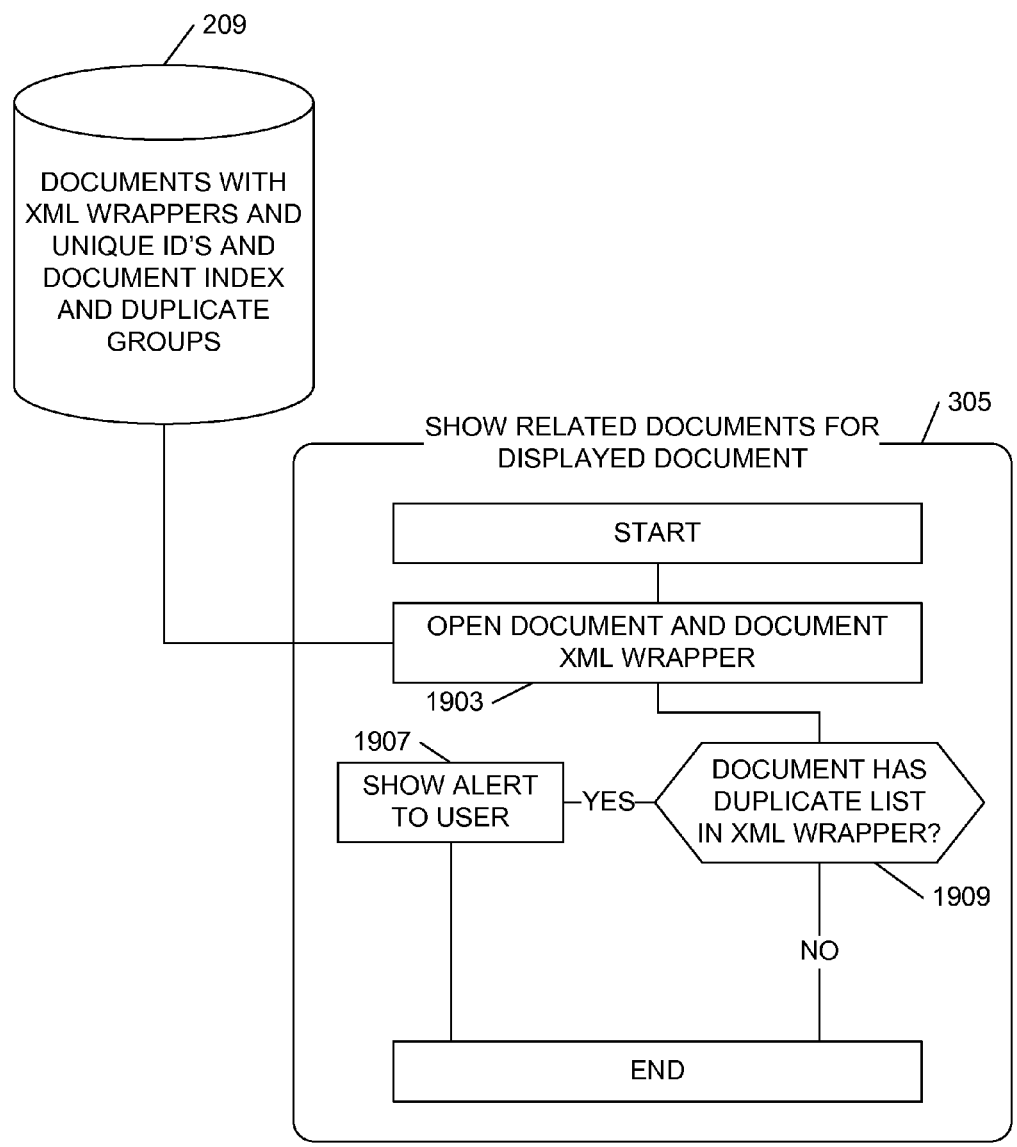
FIG. 19 is a flowchart of an exemplary process to show related documents for displayed documents.

FIG. 19 is a flowchart of an exemplary process 1900 to show related documents for a displayed document. In FIG. 19, step 305, as described with respect to FIG. 3, displays to a user a list of all near and exact-duplicate documents for a particular displayed document (e.g., as the result of a document search or a document lookup from a table of contents, taxonomy, search folder or other lookup mechanism, etc.). Step 1903 reads the document and the document XML wrapper from the database 209. Step 1909 determines if there are unique identifiers of duplicates in the corresponding tag in the XML wrapper for a document and if not the process is completed. Otherwise, step 1907 displays a suitable alert to the user, completing the process.

Figure 20:
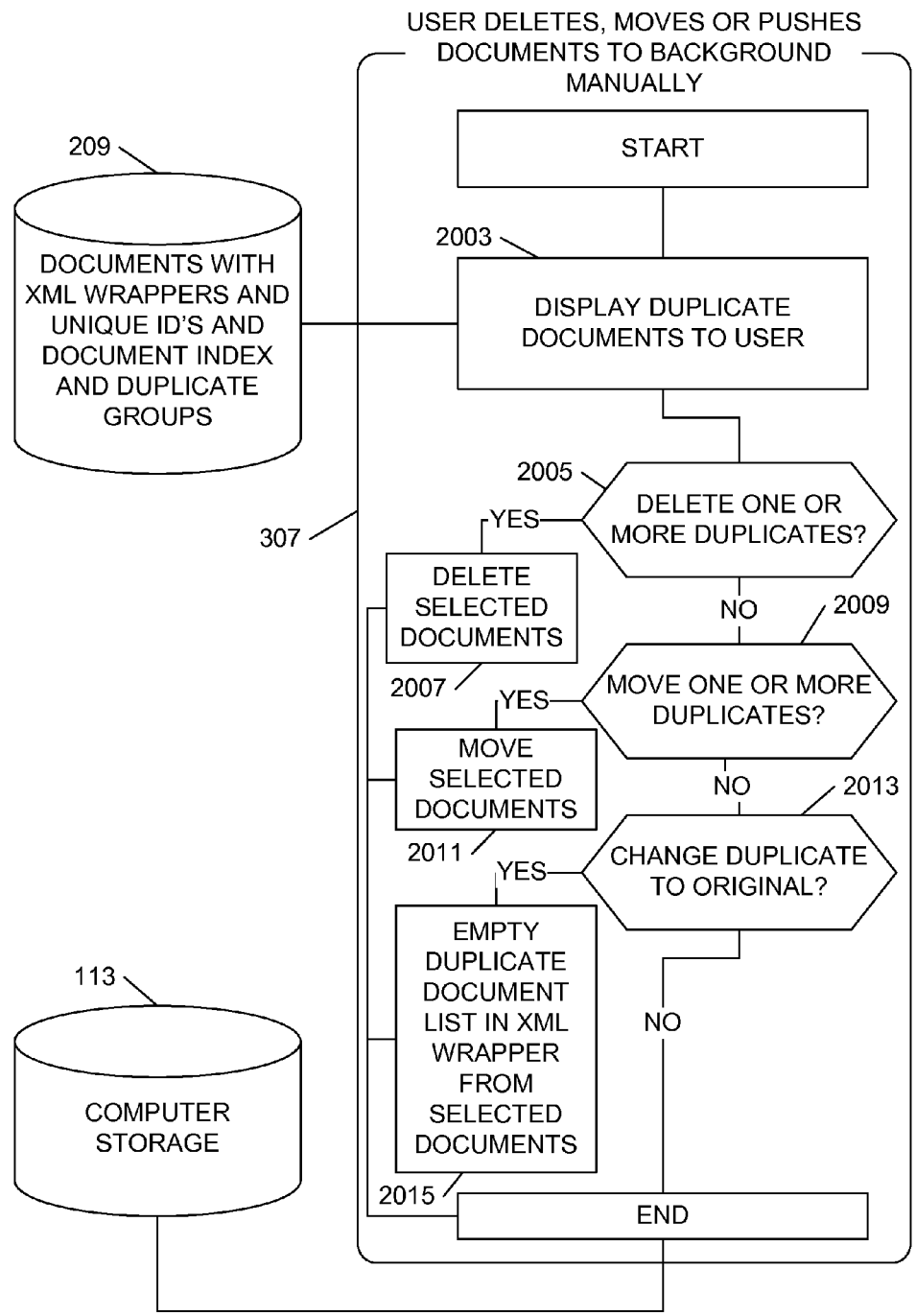
FIG. 20 is a flowchart of an exemplary process to allow users to interactively delete, move or push to the background documents.

FIG. 20 is a flowchart of an exemplary process 2000 to allow user to interactively delete, move or push to the background documents. In FIG. 20, step 307, as described with respect to FIG. 3, allows a user to delete or move a near or exact-duplicate document, or set the document as a definite duplicate, after which the document can be pushed to the background during further user interactions and/or other automatic processes. Step 2003 reads the near and exact-duplicate documents from the database 209, and displays the duplicate documents to the user, for example, by showing the documents in a list, in a cascade or by showing the original document in a left plane and the similar documents adjacent thereto in a cascade, and the like. Accordingly, numerous options can be provided for displaying and processing the duplicate documents. Step 2005 determines if the user wishes to delete a selected document and if so step 2007 deletes the selected document and the corresponding XML wrapper, completing the process. Otherwise, step 2009 determines if the user wishes to move a selected document to another repository or storage device and if so step 2011 move the selected document and the corresponding XML wrapper to another repository or location on another or the same computer system, completing the process. Otherwise, step 2013 determines if the user wishes to mark a document as a definite duplicate so it can be pushed to the background in future searches or other computer process and if not the process is complete. Otherwise, step 2015 sets the assigned tag to TRUE in the XML wrapper so that the corresponding document is considered a definite duplicate, resulting in the computer storage 113 including no duplicate documents or documents that are clearly tagged as duplicates. The non-tagged documents are considered originals that can be used for further processing and available for searching so as to show up in the result lists for user searches, and the like, completing the process.

Figure 21:
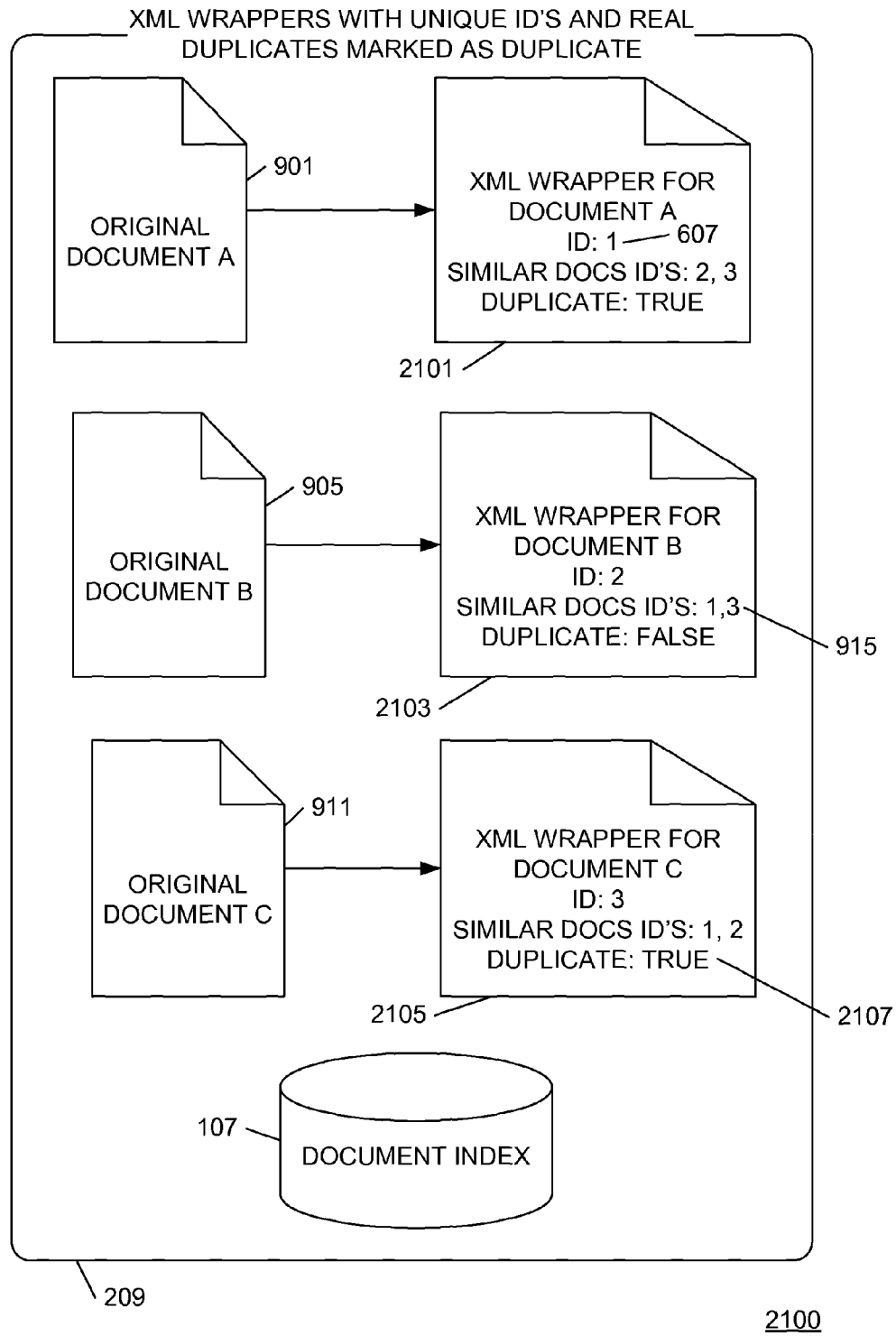
FIG. 21 is an exemplary data structure for XML wrappers that hold document identifiers, lists of near-duplicate document identifiers, and duplicate true or false status.

FIG. 21 illustrates an exemplary data structure 2100 of the database 209 and including XML wrappers 2101, 2103 and 2105 and the respective unique identifiers 607 for each of the documents 901, 905 and 911, the list 915 of near and exact-duplicates and a tag 2107 that indicates if a document is a duplicate (e.g., if the tag 2107 is set to FALSE, the document is considered an original, and if set to TRUE considered a duplicate). The database 209 also stores the full-text search index, represented as the database 107.

The above-described devices and subsystems of the exemplary embodiments can include, for example, any suitable servers, workstations, PCs, laptop computers, PDAs, Internet appliances, handheld devices, cellular telephones, wireless devices, other devices, and the like, capable of performing the processes of the exemplary embodiments. The devices and subsystems of the exemplary embodiments can communicate with each other using any suitable protocol and can be implemented using one or more programmed computer systems or devices.

One or more interface mechanisms can be used with the exemplary embodiments, including, for example, Internet access, telecommunications in any suitable form (e.g., voice, modem, and the like), wireless communications media, and the like. For example, employed communications networks or links can include one or more wireless communications networks, cellular communications networks, G3 communications networks, Public Switched Telephone Network (PSTNs), Packet Data Networks (PDNs), the Internet, intranets, a combination thereof, and the like.

It is to be understood that the devices and subsystems of the exemplary embodiments are for exemplary purposes, as many variations of the specific hardware used to implement the exemplary embodiments are possible, as will be appreciated by those skilled in the relevant art(s). For example, the functionality of one or more of the devices and subsystems of the exemplary embodiments can be implemented via one or more programmed computer systems or devices.

To implement such variations as well as other variations, a single computer system can be programmed to perform the special purpose functions of one or more of the devices and subsystems of the exemplary embodiments. On the other hand, two or more programmed computer systems or devices can be substituted for any one of the devices and subsystems of the exemplary embodiments. Accordingly, principles and advantages of distributed processing, such as redundancy, replication, and the like, also can be implemented, as desired, to increase the robustness and performance of the devices and subsystems of the exemplary embodiments.

The devices and subsystems of the exemplary embodiments can store information relating to various processes described herein. This information can be stored in one or more memories, such as a hard disk, optical disk, magneto-optical disk, RAM, and the like, of the devices and subsystems of the exemplary embodiments. One or more databases of the devices and subsystems of the exemplary embodiments can store the information used to implement the exemplary embodiments of the present inventions. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases thereof.

All or a portion of the devices and subsystems of the exemplary embodiments can be conveniently implemented using one or more general purpose computer systems, microprocessors, digital signal processors, micro-controllers, and the like, programmed according to the teachings of the exemplary embodiments of the present inventions, as will be appreciated by those skilled in the computer and software arts. Appropriate software can be readily prepared by programmers of ordinary skill based on the teachings of the exemplary embodiments, as will be appreciated by those skilled in the software art. Further, the devices and subsystems of the exemplary embodiments can be implemented on the World Wide Web. In addition, the devices and subsystems of the exemplary embodiments can be implemented by the preparation of application-specific integrated circuits or by interconnecting an appropriate network of conventional component circuits, as will be appreciated by those skilled in the electrical art(s). Thus, the exemplary embodiments are not limited to any specific combination of hardware circuitry and/or software.

Stored on any one or on a combination of computer readable media, the exemplary embodiments of the present inventions can include software for controlling the devices and subsystems of the exemplary embodiments, for driving the devices and subsystems of the exemplary embodiments, for enabling the devices and subsystems of the exemplary embodiments to interact with a human user, and the like. Such software can include, but is not limited to, device drivers, firmware, operating systems, development tools, applications software, and the like. Such computer readable media further can include the computer program product of an embodiment of the present inventions for performing all or a portion (if processing is distributed) of the processing performed in implementing the inventions. Computer code devices of the exemplary embodiments of the present inventions can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like. Moreover, parts of the processing of the exemplary embodiments of the present inventions can be distributed for better performance, reliability, cost, and the like.

As stated above, the devices and subsystems of the exemplary embodiments can include computer readable medium or memories for holding instructions programmed according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

Thus, the exemplary embodiments provides for improved information management, information access, Electronic Discovery (e-Discovery), including detecting of duplicate and near-duplicate emails (e.g., properties, email body, attachments, etc.), electronic documents, content, electronic or objects, tagging of such potentially duplicate and near-duplicate objects, visualizing of duplicate and near-duplicate objects when a object is presented to a end user through a computer system, and the like.

While the present inventions have been described in connection with a number of exemplary embodiments, and implementations, the present inventions are not so limited, but rather cover various modifications, and equivalent arrangements, which fall within the purview of the appended claims.

What is claimed is:

1. A method for identifying near and exact-duplicate documents in a document collection, the method comprising:
for each document in the collection performing by a computer the steps of:
reading textual content from the document;
filtering the textual content based on user settings;
determining N most frequent words from the filtered textual content of the document to generate a first most frequent, word-1, to an Nth most frequent word, word-N, sorted from highest to lowest frequency;
performing a quorum search using the N most frequent words from the filtered textual content in the document with a threshold M, wherein the threshold M is used to retrieve documents from the document collection having a number M of the N most frequent words;
sorting results from the quorum search based on relevancy,
whereby based on the values of N and M near and exact-duplicate documents are identified in the document collection; and
calculating N based on a recall percentage value user setting by multiplying the percentage value times a number of total words in the filtered text.

2. The method of claim 1, further comprising associating a respective XML wrapper for each document in the collection,
wherein the XML wrapper includes a unique document identification for the document, and unique document identifications for near and exact-duplicate documents of the document, and
wherein the reading of the textual content from the document includes reading the XML wrapper for the document.

3. The method of claim 1, further comprising reading user preferences for the values of N and M, and including content filtering settings for the filtering of the textual content,
wherein the content filtering settings include filtering of numbers, keyfields, noise words, and optical character recognition errors.

4. The method of claim 1, wherein the reading of the textual content from the document includes reading user settings to determine a text to read from the document.

5. The method of claim 4, wherein the user settings to determine the text to read from the document include settings for reading the entire text from the document, reading only a first number of Kb from the document, reading random sections of text from the document, and reading only a first number of Kb after a key phrase or key word from the document.

6. The method of claim 1, further comprising determining the relevancy by taking a number of hits for the quorum search in the document and dividing the number of hits by a size of the document in kilobytes of text in the document or a size in kilobytes for the entire document; and calculating M based on a precision value percentage user setting by multiplying the percentage value times the N value.

7. A computer program product for identifying near and exact-duplicate documents in a document collection and including one or more computer readable instructions embedded on a non-transitory computer readable medium and configured to cause one or more computer processors to perform the steps of:

for each document in the collection:
reading textual content from the document;
filtering the textual content based on user settings;
determining N most frequent words from the filtered textual content of the document to generate a first most frequent, word-1, to an Nth most frequent word, word-N, sorted from highest to lowest frequency;
performing a quorum search using the N most frequent words from the filtered textual content in the document with a threshold M, wherein the threshold M is used to retrieve documents from the document collection having a number M of the N most frequent words;
sorting results from the quorum search based on relevancy,
whereby based on the values of N and M near and exact-duplicate documents are identified in the document collection; and
calculating N based on a recall percentage value user setting by multiplying the percentage value times a number of total words in the filtered text.

8. The computer program product of claim 7, further comprising associating a respective XML wrapper for each document in the collection,
wherein the XML wrapper includes a unique document identification for the document, and unique document identifications for near and exact-duplicate documents of the document, and
wherein the reading of the textual content from the document includes reading the XML wrapper for the document.

9. The computer program product of claim 7, further comprising reading user preferences for the values of N and M, and including content filtering settings for the filtering of the textual content,
wherein the content filtering settings include filtering of numbers, keyfields, noise words, and optical character recognition errors.

10. The computer program product of claim 7, wherein the reading of the textual content from the document includes reading user settings to determine a text to read from the document.

11. The computer program product of claim 10, wherein the user settings to determine the text to read from the document include settings for reading the entire text from the document, reading only a first number of Kb from the document, reading random sections of text from the document, and reading only a first number of Kb after a key phrase or key word from the document.

12. The computer program product of claim 11, further comprising determining the relevancy by taking a number of hits for the quorum search in the document and dividing the number of hits by a size of the document in kilobytes of text in the document or a size in kilobytes for the entire document; and calculating M based on a precision value percentage user setting by multiplying the percentage value times the N value.

13. A system for identifying near and exact-duplicate documents in a document collection, the system comprising:
a computer configured to perform for each document in the collection the steps of:
reading textual content from the document;
filtering the textual content based on user settings;
determining N most frequent words from the filtered textual content of the document to generate a first most frequent, word-1, to an Nth most frequent word, word-N, sorted from highest to lowest frequency;
performing a quorum search using the N most frequent words from the filtered textual content in the document with a threshold M, wherein the threshold M is used to retrieve documents from the document collection having a number M of the N most frequent words;
sorting results from the quorum search based on relevancy,
whereby based on the values of N and M near and exact-duplicate documents are identified in the document collection; and
calculating N based on a recall percentage value user setting by multiplying the percentage value times a number of total words in the filtered text.

14. The system of claim 13, wherein the computer is further configured for associating a respective XML wrapper for each document in the collection,
wherein the XML wrapper includes a unique document identification for the document, and unique document identifications for near and exact-duplicate documents of the document, and
wherein the reading of the textual content from the document includes reading the XML wrapper for the document.

15. The system of claim 13, wherein the computer is further configured for reading user preferences for the values of N and M, and including content filtering settings for the filtering of the textual content,
wherein the content filtering settings include filtering of numbers, keyfields, noise words, and optical character recognition errors.

16. The system of claim 13, wherein the reading of the textual content from the document includes reading user settings to determine a text to read from the document.

17. The system of claim 16, wherein the user settings to determine the text to read from the document include settings for reading the entire text from the document, reading only a first number of Kb from the document, reading random sections of text from the document, and reading only a first number of Kb after a key phrase or key word from the document.

18. The system of claim 13, wherein the computer is further configured for determining the relevancy by taking a number of hits for the quorum search in the document and dividing the number of hits by a size of the document in kilobytes of text in the document or a size in kilobytes for the entire document; and calculating M based on a precision value percentage user setting by multiplying the percentage value times the N value.

* * * * *